United States Patent
Ji et al.

(10) Patent No.: US 10,856,274 B2
(45) Date of Patent: Dec. 1, 2020

(54) POWER HEADROOM REPORTING METHOD AND APPARATUS

(71) Applicant: Huawei Technologies Co., Ltd., Shenzhen (CN)

(72) Inventors: Liuliu Ji, Shanghai (CN); Haibao Ren, Shanghai (CN); Long Qin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/673,509

(22) Filed: Nov. 4, 2019

(65) Prior Publication Data

US 2020/0145987 A1     May 7, 2020

Related U.S. Application Data

(63) Continuation of application No. PCT/CN2018/085471, filed on May 3, 2018.

(30) Foreign Application Priority Data

May 5, 2017    (CN) .......................... 2017 1 0313801

(51) Int. Cl.
    *H04W 72/04*       (2009.01)
    *H04W 52/24*       (2009.01)
    *H04W 52/36*       (2009.01)

(52) U.S. Cl.
    CPC ...... *H04W 72/0413* (2013.01); *H04W 52/242* (2013.01); *H04W 52/365* (2013.01); *H04W 72/044* (2013.01)

(58) Field of Classification Search
CPC combination set(s) only.
See application file for complete search history.

(56) References Cited

U.S. PATENT DOCUMENTS

2018/0279339 A1*   9/2018   Lohr ...................... H04W 52/34

* cited by examiner

*Primary Examiner* — Keith Ferguson
(74) *Attorney, Agent, or Firm* — Leydig, Voit & Mayer, Ltd.

(57) ABSTRACT

Embodiments of this application provide a power headroom reporting method and apparatus. Impact of introduction of multi-beam transmission, a plurality of time-frequency resource configurations, or an uplink multi-waveform technology on a power headroom is considered, so that the power headroom is calculated and reported more accurately, to help a network side make a scheduling decision, thereby improving communication performance.

20 Claims, 7 Drawing Sheets

POWER HEADROOM REPORTING METHOD AND APPARATUS

CROSS-REFERENCE TO RELATED APPLICATIONS

This application is a continuation of International Application No. PCT/CN2018/085471, filed on May 3, 2018, which claims priority to Chinese Patent Application No. 201710313801.7, filed on May 5, 2017. The disclosures of the aforementioned applications are hereby incorporated by reference in their entireties

TECHNICAL FIELD

Embodiments of this application relate to the field of communications technologies, and in particular, to a power headroom reporting method and apparatus.

BACKGROUND

A power headroom (PH) is a difference between a maximum transmit power allowed by a terminal and a required transmit power, and may reflect a specific transmit power that can be used for the terminal in addition to the required transmit power. The terminal reports the PH to a network side, and the network side may use the PH as a reference for allocating a resource to the terminal. For example, when a PH value is negative, it indicates that the required transmit power exceeds the maximum transmit power allowed by the terminal, and therefore the network side may reduce a bandwidth resource allocated to the terminal. When a PH value is positive, it indicates that the maximum transmit power allowed by the terminal can meet a power required for current information transmission, and therefore the network side may allocate more bandwidth resources to the terminal.

It can be learned that correct PH reporting affects resource allocation by the network side to the terminal, and has significant impact on communication performance.

SUMMARY

Embodiments of this application provide a power headroom reporting method and apparatus, to improve PH reporting accuracy.

According to one aspect, a power headroom reporting method is provided, and includes: calculating, by a terminal, a power headroom (PH) in a subframe of a serving cell, and reporting a power headroom report (PHR), where the terminal performs transmission in the subframe of the serving cell through K beams or beam groups, and K is a positive integer greater than or equal to 2; and the calculating, by a terminal, a power headroom includes:

calculating the PH based on a beam-level power control parameter of the K beams or beam groups to obtain one PH value; or separately calculating PHs for K1 beams or beam groups to obtain K1 PH values, where K1 is less than or equal to K; and the PHR reported by the terminal includes:

information about the PH value obtained through calculation based on the beam-level power control parameter of the K beams or beam groups; or information about the K1 PH values; or information about a reference PH value and information about an offset value, where the reference PH value is one of the K1 PH values, and the offset value is an offset value of another PH value in the K1 PH values relative to the reference PH value; or the reference PH value is a baseline PH value, and the offset value is offset values of the K1 PH values relative to the baseline PH value; or information about an average value of the K1 PH values.

Optionally, the beam-level power control parameter include one or more of the following parameters: a nominal power $P_0$, a path loss adjustment factor $\alpha$, a path loss $PL_c$, a power offset value $\Delta_{TF,c}(i)$, a power adjustment value $f_c(i)$, and a transmission bandwidth $M_c(i)$.

In an implementation, the terminal calculates the PH based on a first parameter of the K beams or beam groups, where the first parameter is one of the nominal power $P_0$, the path loss adjustment factor $\alpha$, the path loss $PL_c$, the power offset value $\Delta_{TF,c}(i)$, the power adjustment value $f_c(i)$, and the transmission bandwidth $M_c(i)$.

Optionally, that the terminal calculates the PH based on the first parameter of the K beams or beam groups includes: calculating an average value of values of the first parameter of the K beams or beam groups, where the average value includes an average decibel dB value or an average linear value; and calculating the PH based on the average value obtained through calculation.

Optionally, that the terminal calculates the PH based on the first parameter of the K beams or beam groups includes: calculating a sum of values of the first parameter of the K beams or beam groups, where the sum includes a sum of dB values or a sum of linear values; and calculating the PH based on the sum obtained through calculation.

In an implementation, the terminal calculates the PH based on a plurality of parameters of the K beams or beam groups, where the plurality of parameters are some or all of the nominal power $P_0$, the path loss adjustment factor $\alpha$, the path loss $PL_c$, the power offset value $\Delta_{TF,c}(i)$, the power adjustment value $f_c(i)$, and the transmission bandwidth $M_c(i)$.

Optionally, that the terminal calculates the PH based on a plurality of parameters of the K beams or beam groups includes the following manners:

calculating an average value of each of the plurality of parameters of the K beams or beam groups, where the average value includes an average decibel dB value or an average linear value; and calculating the PH based on a plurality of average values obtained through calculation; or calculating a sum of each of the plurality of parameters of the K beams or beam groups, where the sum includes a sum of decibel dB values or a sum of linear values; and calculating the PH based on a plurality of sums obtained through calculation; or calculating a comprehensive average value of the plurality of parameters, where the comprehensive average value includes an average decibel dB value or an average linear value; and calculating the PH based on the comprehensive average value obtained through calculation; or calculating a sum of beam-level power portions of the plurality of parameters, where the sum includes a sum of decibel dB values or a sum of linear values; and calculating the PH based on the sum obtained through calculation; or separately calculating power estimation values of the K beams or beam groups; calculating an average value of the K power estimation values, where the average value includes an average decibel dB value or an average linear value; and calculating the PH based on the average value of the K power estimation values; or separately calculating power estimation values of the K beams or beam groups; calculating a sum of the K power estimation values, where the sum includes a sum of decibel dB values or a sum of linear values; and calculating the PH based on the sum of the K power estimation values.

In addition, a PH reporting apparatus is further provided, and includes units or means for performing the steps in the foregoing method. A PH reporting apparatus may be further provided, and include at least one processing element and at least one storage element. The at least one storage element is configured to store a program and data, and the at least one processing element is configured to perform any one of the foregoing methods.

In addition, a program is further provided. When being executed by a processor, the program is used to perform any one of the foregoing methods. A program product may be further provided, for example, a computer readable storage medium, and include the program.

According to the power headroom reporting method and apparatus provided in the embodiments of this application, impact of introduction of multi-beam transmission on the PH is considered, so that the PH is calculated and reported more accurately, to help a network side make a scheduling decision, thereby improving communication performance.

According to another aspect, a power headroom reporting method is provided, and includes: calculating, by a terminal, a PH in a subframe of a serving cell, and reporting a PHR, where the terminal supports nu time-frequency resource configurations, and nu is a positive integer greater than or equal to 2; and the calculating, by a terminal, a PH includes:

performing calculation based on a time-frequency resource configuration-level power control parameter of the nu time-frequency resource configurations to obtain a PH value; or separately calculating PHs for nu1 time-frequency resource configurations to obtain nu1 PH values, where nu1 is less than or equal to nu.

The PHR reported by the terminal includes information about the PH value obtained through calculation based on the time-frequency resource configuration-level power control parameter of the nu time-frequency resource configurations. Alternatively, the PHR includes information about the nu1 PH values obtained through calculation. Alternatively, the PHR includes information about a reference PH value and information about an offset value. The reference PH value is one of the nu1 PH values, and the offset value is an offset value of another PH value in the nu1 PH values relative to the reference PH value. In this case, there are nu1-1 offset values. Alternatively, the reference PH value is a baseline PH value, and the offset value is offset values of the nu1 PH values relative to the baseline PH value. In this case, there are nu1 offset values.

Optionally, the time-frequency resource configuration-level power control parameter include one or both of the following parameters: a nominal power $P_0$ (or $P_O$) and a transmission bandwidth $M_c(i)$.

In an implementation, the terminal calculates the PH based on a first parameter of the nu time-frequency resource configurations, where the first parameter is one of the nominal power $P_0$ (or $P_O$) and the transmission bandwidth $M_c(i)$.

Optionally, that the terminal calculates the PH based on the first parameter of the nu time-frequency resource configurations includes: calculating a sum of values of the first parameter of the nu time-frequency resource configurations, where the sum includes a sum of dB values or a sum of linear values; and calculating the PH based on the sum obtained through calculation.

In an implementation, the terminal calculates the PH based on a plurality of parameters of the nu time-frequency resource configurations, where the plurality of parameters are the nominal power $P_0$ (or $P_O$) and the transmission bandwidth $M_c(i)$.

Optionally, that the terminal calculates the PH based on a plurality of parameters of the nu time-frequency resource configurations includes the following manners:

calculating a sum of each of the plurality of parameters of the nu time-frequency resource configurations, where the sum includes a sum of decibel dB values or a sum of linear values; and calculating the PH based on a plurality of sums obtained through calculation; or calculating a sum of time-frequency resource configuration-level power portions of the plurality of parameters, where the sum includes a sum of decibel dB values or a sum of linear values; and calculating the PH based on the sum obtained through calculation; or separately calculating power estimation values of the nu time-frequency resource configurations; calculating a sum of the nu power estimation values, where the sum includes a sum of decibel dB values or a sum of linear values; and calculating the PH based on the sum of the nu power estimation values.

In addition, a PH reporting apparatus is further provided, and includes units or means for performing the steps in the foregoing method. A PH reporting apparatus may be further provided, and include at least one processing element and at least one storage element. The at least one storage element is configured to store a program and data, and the at least one processing element is configured to perform any one of the foregoing methods.

In addition, a program is further provided. When being executed by a processor, the program is used to perform any one of the foregoing methods. A program product may be further provided, for example, a computer readable storage medium, and include the program.

According to the power headroom reporting method and apparatus provided in the embodiments of this application, impact of introduction of a plurality of time-frequency resource configurations on the PH is considered, so that the PH is calculated and reported more accurately, to help a network side make a scheduling decision, thereby improving communication performance.

DESCRIPTION OF EMBODIMENTS

Some terms in this application are described below, to help a person skilled in the art have a better understanding.

(1) A terminal is also referred to as user equipment (UE), a mobile station (MS), a mobile terminal (MT), or the like, and is a device that provides voice and/or data connectivity for a user, for example, a handheld device or an in-vehicle device that has a wireless connection function. Currently, some examples of terminals are a mobile phone, a tablet computer, a notebook computer, a palmtop computer, a mobile Internet device (MID), a wearable device, a virtual reality device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

(2) A radio access network (RAN) is a part that is in a network and that connects a terminal to a wireless network. A RAN node (or device) is a node (or device) in the radio access network, and may also be referred to as a base station. Currently, some examples of RAN nodes are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB (HNB)), a baseband unit (BBU), or a Wi-Fi access point (AP). In addition, in a network structure, the RAN may include a centralized unit (CU) node and a distributed unit (DU) node. In this structure, a protocol layer of an eNB in a long term evolution (LTE) system is split, where some functions of the protocol layer are controlled by a CU in a centralized manner, remaining or all functions of the protocol layer are distributed in DUs, and the CU controls the DUs in a centralized manner.

(3) "A plurality of" means two or more, and another quantifier is similar. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

Figure 1:
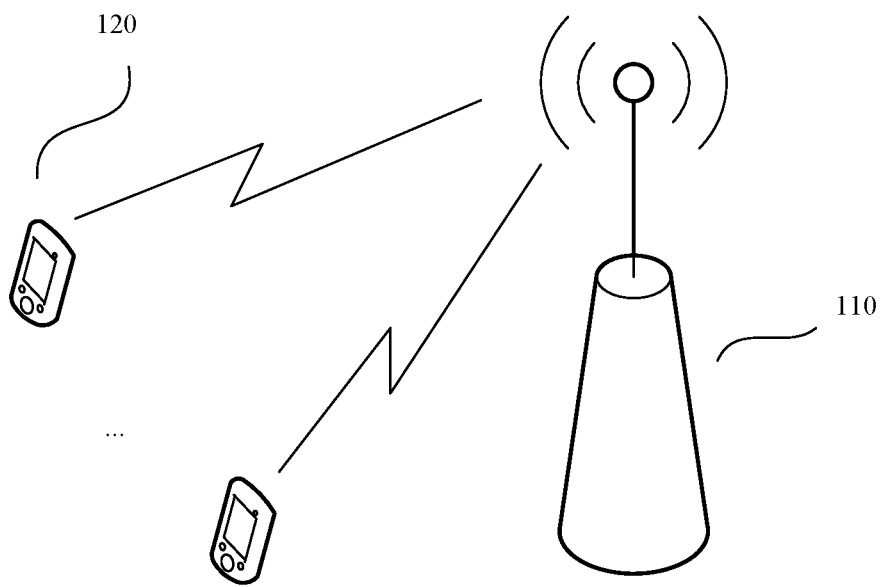
FIG. 1 is a schematic diagram of a communications system according to an embodiment of this application.

FIG. 1 is a schematic diagram of a communications system according to an embodiment of this application. As shown in FIG. 1, a terminal 120 accesses a wireless network through a RAN node 110, to obtain a service of an external network (for example, the Internet) through the wireless network, or to communicate with another terminal through the wireless network. A radio resource for communication between the terminal 120 and the RAN node 110 is allocated by the RAN node 110. When the RAN node 110 does not know a power status of the terminal, the RAN node 110 may allocate an excessively high transmission bandwidth to the terminal. Consequently, a signal to interference plus noise ratio (SINR) is relatively low. Therefore, the terminal 120 provides the RAN node 110 with information about a PH, so that the RAN node uses the PH as a reference for adjusting a transmission bandwidth allocated to the terminal.

The PH is a difference between a maximum transmit power allowed by the terminal and a required transmit power. The required transmit power is a power value obtained by the terminal through estimation, in other words, the required transmit power is a power estimation value instead of an actual transmit power of the terminal. In this application, a transmit power may also be referred to as a transmission power.

The PH may reflect a specific transmit power that can be used for the terminal in addition to the required transmit power. The terminal reports the PH to the RAN node, and the RAN node may use the PH as a reference for allocating a resource to the terminal. The PH reported by the terminal may be referred to as a power headroom report (PHR). In addition, a PH value in the PHR may be positive, negative, or zero. When the PH value is negative, it indicates that the required transmit power exceeds the maximum transmit power allowed by the terminal, and therefore the RAN node may reduce a bandwidth resource allocated to the terminal, to improve signal quality of a signal transmitted by the terminal to the RAN node in an uplink direction. When the PH value is positive, it indicates that the maximum transmit power allowed by the terminal can meet a power required for current information transmission, and therefore the RAN node may allocate more bandwidth resources to the terminal, to improve resource utilization.

The PH is valid for a subframe i of a serving cell c, in other words, a PH value is calculated based on the subframe i of the serving cell c, and reflects a difference between a maximum transmit power allowed by the terminal and a required transmit power in the subframe i of the serving cell c. The maximum transmit power allowed by the terminal is briefly referred to as a maximum transmit power below. Currently, the PH is calculated usually in three types of manners, which are described as follows.

First type (or Type 1): The required transmit power is a transmit power required for transmitting a physical uplink shared channel (PUSCH), to be specific, a difference between the maximum transmit power allowed by the terminal and the transmit power required for transmitting the PUSCH is calculated.

When the terminal transmits the PUSCH but does not transmit a physical uplink control channel (PUCCH) in the subframe i of the serving cell c, the PH may be calculated by using the following formula (1):

$$PH_{type1,c}(i) = PC_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \quad (1)$$

$PH_{type1,c}(i)$ represents the PH calculated in the subframe i of the serving cell c in the first type. $PC_{MAX,c}(i)$ represents the maximum transmit power (also referred to as a maximum transmission power, and $P_{CMAX,c}(i)$ mentioned below can also be explained in a similar manner). $M_{PUSCH,c}(i)$ represents a transmission bandwidth of the PUSCH, and is expressed in a quantity of resource blocks (RB), in other words, expressed in units of RBs. $P_{O\_PUSCH,c}(j)$ represents a nominal (or reference) power (also referred to as a power density reference value) of the PUSCH, and includes a cell nominal power ($P_{O\_NOMINAL\_PUSCH,c}(j)$) of the PUSCH and a terminal-specific nominal power ($P_{O\_UE\_PUSCH,c}(j)$) of the PUSCH, where j=0, 1, or 2. For example, j=0 during semi-persistent scheduling, j=1 during dynamic scheduling, and j=2 during random access. $\alpha_c(j)$ represents a path loss adjustment factor (or a compensation factor). $PL_c$ represents a path loss. $\Delta_{TF,c}(i)$ represents a power offset value related to a modulation and coding scheme or signal content, and reflects impact of the modulation and coding scheme or the signal content on a power. The signal content refers to control information transmitted on the PUSCH. For example, when a channel quality indicator (CQI) is transmitted on the PUSCH, the RAN node expects to have a higher receive power, and correspondingly the PUSCH is transmitted at a higher power. This "larger" offset value is reflected by $\Delta_{TF,c}(i)$. $f_c(i)$ represents a power adjustment value generated by the terminal through closed-loop power control. Meanings of c and i in the parameters in the foregoing formula indicate that the parameters are specific to the serving cell c and the subframe i.

When the terminal transmits the PUSCH and the PUCCH in the subframe i of the serving cell c, the PH may be calculated by using the following formula (2):

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \quad (2)$$

$\tilde{P}_{CMAX,c}(i)$ represents a maximum transmit power, and $\tilde{P}_{CMAX,c}(i)$ is obtained through calculation by assuming that only the PUSCH is transmitted in the subframe i. For descriptions of other parameters, refer to the descriptions in the foregoing formula. Details are not described herein again.

When the terminal does not transmit the PUSCH in the subframe i of the serving cell c, or when a licensed-assisted access (LAA) secondary serving cell (LAA SCell) is configured for the terminal for uplink transmission, the terminal receives downlink control information (DCI) in a format 0A/0B/4A/4B (DCI Format 0A/0B/4A/4B) in the serving cell c, and an information element "PUSCH trigger A" in the DCI is set to 1, if the terminal reports the PH in the serving cell c during transmission of the PUSCH corresponding to the DCI, the PH may be calculated by using the following formula (3):

$$PH_{type1,c}(i) = \tilde{P}_{CMAX,c}(i) - \{P_{O\_PUSCH,c}(l) + \alpha_c(l) \cdot PL_c + f_c(i)\} \quad (3)$$

$\tilde{P}_{CMAX,c}(i)$ represents a maximum transmit power, and is obtained through calculation by assuming that MPR=0 dB, A-MPR=0 dB, P-MPR=0 dB, and $T_C$=0 dB. MPR is a maximum power reduction, A-MPR is an additional maximum power reduction, and P-MPR is a maximum power reduction set by power management function (maximum power reduction set by power management function). $T_C$ and P-MPR are values that may affect maximum uplink performance for a selected uplink transmission path. For example, when $T_C$ affects the maximum uplink performance, the value of $T_C$ is 1.5 dB; or when $T_C$ does not affect the maximum uplink performance, the value of $T_C$ is 0 dB. For descriptions of other parameters, refer to the descriptions in the foregoing formula. Details are not described herein again.

Second type (or Type 2): The required transmit power is a transmit power required for transmitting the PUSCH and the PUCCH, to be specific, a difference between the maximum transmit power allowed by the terminal and the transmit power required for transmitting both the PUCCH and the PUSCH is calculated.

When the terminal transmits both the PUSCH and the PUCCH in the subframe i of a primary cell, the PH may be calculated by using the following formula (4):

$PH_{type2}(i)$ represents the PH calculated in the subframe i in the second type. $P_{O\_PUCCH}$ represents a nominal (or reference) power (also referred to as a power density reference value) of the PUCCH, and includes a cell nominal power ($P_{O\_NOMINAL\_PUCCH}$) of the PUCCH and a terminal-specific nominal power ($P_{O\_UE\_PUCCH}$) of the PUCCH. $h(n_{CQI}, n_{HARQ}, n_{SR})$ represents a power offset value related to a PUCCH format, and reflects impact of content of signaling transmitted on the PUCCH on a power. $h(n_{CQI}, n_{HARQ}, n_{SR})$ is related to a quantity of bits of a CQI transmitted on the PUCCH, a quantity of bits of hybrid automatic repeat request (HARQ) feedback information (for example, ACK/NACK), a quantity of bits of a scheduling request (SR). $\Delta_{F\_PUCCH}(F)$ represents a power offset value related to a PUCCH format. The parameter is provided by a higher layer, and a value of the parameter represents a power offset value in the PUCCH format F relative to a PUCCH format 1a. The format F may be a format 1, 1b, 2, 2a, 2b, 3, 4, 5, or 1b with channel selection. $\Delta_{TxD}(F')$ represents a power offset value related to a PUCCH format F' when the terminal transmits the PUCCH by using a transmit diversity technology. For example, if the terminal is configured to transmit the PUCCH on two antenna ports, a value of the parameter is provided by the higher layer; otherwise, a value of the parameter is 0. The format F' may be a format 1, 1a/1b, 1b with channel selection, 2/2a/2b, or 3. $g(i)$ represents a power adjustment value (or a compensation value) generated by the terminal through closed-loop power control. For descriptions of other parameters, refer to the descriptions in the foregoing formula. Details are not described herein again.

When the terminal transmits the PUSCH but does not transmit the PUCCH in the subframe i of the primary cell, the PH may be calculated by using the following formula (5):

$$PH_{type2}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH} + PL_c + g(i))/10}\right) \quad (5)$$

For descriptions of parameters, refer to the descriptions in the foregoing formula. Details are not described herein again.

When the terminal transmits the PUCCH but does not transmit the PUSCH in the subframe i of the primary cell, the PH may be calculated by using the following formula (6):

$$PH_{type2}(i) = P_{CMAX,c}(i) - 10\log_{10}\left(10^{(10\log_{10}(M_{PUSCH,c}(i)) + P_{O\_PUSCH,c}(j) + \alpha_c(j) \cdot PL_c + \Delta_{TF,c}(i) + f_c(i))/10} + 10^{(P_{0\_PUCCH} + PL_c + h(n_{CQI}, n_{HARQ}, n_{SR}) + \Delta_{F\_PUCCH}(F) + \Delta_{TxD}(F') + g(i))/10}\right) \quad (4)$$

$$PH_{type2}(i) = P_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10}\end{array}\right) \quad (6)$$

For descriptions of parameters, refer to the descriptions in the foregoing formula. Details are not described herein again.

When the terminal transmits neither the PUCCH nor the PUSCH in the subframe i of the primary cell, the PH may be calculated by using the following formula (7):

$$PH_{type2}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{0\_PUCCH}+PL_c+g(i))/10}\end{array}\right) \quad (7)$$

$\tilde{P}_{CMAX,c}(i)$ represents a maximum transmit power, and is obtained through calculation by assuming that MPR=0 dB, A-MPR=0 dB, P-MPR=0 dB, and $T_C$=0 dB. For descriptions of other parameters, refer to the descriptions in the foregoing formula. Details are not described herein again.

Before a PDCCH (or an enhanced physical downlink control channel (EPDCCH)) is detected and the PH is generated, when the terminal cannot determine whether PUCCH transmission corresponding to physical downlink shared channel (PDSCH) transmission is to be performed in the subframe i of the primary cell, or does not determine a to-be-used PUCCH resource, the PH may be calculated by using the following formula (8). In this case, the following condition is met: a PUCCH format 1b with channel selection and a simultaneous PUCCH-PUSCH (to be specific, a configuration field, simultaneous PUCCH-PUSCH, allows the terminal to send the PUCCH and the PUSCH simultaneously) are configured for the terminal; or a PUCCH format 3 and a simultaneous PUCCH-PUSCH are configured for the terminal, and the PUCCH format 1b with channel selection is used for HARQ information feedback.

$$PH_{type2}(i) = P_{CMAX,c}(i) - 10\log_{10} \quad (8)$$

$$\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+g(i))/10}\end{array}\right)$$

For descriptions of parameters, refer to the descriptions in the foregoing formula. Details are not described herein again.

Third type (or Type 3): The required transmit power is a transmit power required for transmitting a sounding reference signal (SRS), to be specific, a difference between the maximum transmit power allowed by the terminal and the transmit power required for transmitting the SRS is calculated.

PUSCH/PUCCH transmission is not configured for the serving cell c in a frame structure type 2. If the terminal transmits the SRS in the subframe i of the serving cell c, the PH may be calculated by using the following formula (9). If the terminal does not transmit the SRS in the subframe i of the serving cell c, the PH may be calculated by using the following formula (10):

$$PH_{type3,c}(i) = P_{CMAX,c}(i) - \{10\log_{10}(M_{SRS,c}) + P_{O\_SRS,c}(m) + \alpha_{SRS,c}\cdot PL_c + f_{SRS,c}\} \quad (9)$$

$$PH_{type3,c}(i) = \tilde{P}_{CMAX,c}(i) - \{P_{O\_SRS,c}(1) + \alpha_{SRS,c}\cdot PL_c + f_{SRS,c}\} \quad (10)$$

$PH_{type3,c}(i)$ represents the PH calculated in the subframe i of the serving cell c in the third type. $\tilde{P}_{CMAX,c}(i)$ represents a maximum transmit power, and is obtained through calculation by assuming that the SRS is transmitted in the subframe i and that MPR=0 dB, A-MPR=0 dB, P-MPR=0 dB, and $T_C$=0 dB. $M_{SRS,c}$ represents a transmission bandwidth of the SRS, and is expressed in a quantity of RBs, in other words, expressed in units of RBs. $P_{O\_SRS,c}(m)$ represents a nominal (or reference) power (also referred to as a power density reference value) of the SRS, and includes a cell nominal power ($P_{O\_NOMINAL\_SRS,c}(m)$) of the SRS and a terminal-specific nominal power ($P_{O\_UE\_SRS,c}(m)$) of the SRS, where m=0 or 1. $\alpha_{SRS,c}$ represents a path loss adjustment factor (or a compensation factor) of the SRS. $PL_c$ represents a path loss. $f_{SRS,c}(i)$ represents a power adjustment value of the SRS generated by the terminal through closed-loop power control, namely, a closed-loop power adjustment value of the SRS. Meanings of c and i in the parameters in the foregoing formulas indicate that the parameters are specific to the serving cell c and the subframe i.

With development of a wireless communications technology, an existing PH reporting method may not adapt to evolution of the technology, thereby causing PH inaccuracy, affecting accuracy of allocating a transmission bandwidth by the RAN node based on the PH reported by the terminal, and causing system performance deterioration. For example, with development of an antenna technology, the terminal may communicate with the RAN node through a plurality of beams. This is referred to as a multi-beam transmission technology below. For another example, the RAN node may configure a plurality of time-frequency resource configurations for the terminal. The time-frequency resource configuration include one or all of the following configurations: a frequency domain length of a resource element (RE), namely, a subcarrier spacing; a time domain length of the RE, namely, a time length of an orthogonal frequency division multiplexing (OFDM) symbol; a quantity of time resource units in a scheduling time unit; a cyclic prefix (CP) type of an OFDM symbol, and the like. For example, the subcarrier spacing may be 15 kHz, 30 kHz, or 60 kHz. The time length of the OFDM symbol is in inverse proportion to the subcarrier spacing. Therefore, a plurality of time lengths of the OFDM symbol may be configured. The scheduling time unit is a unit or a granularity of scheduling resources in time domain, and the scheduling time unit is referred to as a transmission time interval (TTI) in an LTE system. The time resource unit is a resource unit in time domain. It can be learned that the quantity of time resource units in the scheduling time unit is a quantity of time resource units scheduled once in time domain. For example, when the scheduling time unit is one subframe, the quantity of time resource units in the scheduling time unit may be a quantity of OFDM symbols scheduled once in the subframe. The CP type may include a normal CP, an extended CP, or the like. A technology using the plurality of time-frequency resource configurations may be referred to as a numerology technology. For another example, in the LTE system, the terminal supports a waveform technology in uplink transmission, namely, a single carrier-orthogonal frequency division multiplexing (SC-OFDM) technology. With evolution of the technology, the terminal may also support a cyclic prefix-orthogonal frequency division multiplexing (CP-OFDM) technology in uplink transmission, for example, a discrete fourier transform (DFT) spread orthogonal frequency division multiplexing DFT-S-OFDM technology. When the terminal uses the multi-beam transmission technology, or uses the plurality of time-frequency resource configurations, or supports more than one waveform technology in uplink transmission, in the existing PH reporting method, a PHR is reported only for a single beam, a single time-frequency resource configuration, or a single waveform technology, and therefore a PH status of the terminal cannot be accurately reflected. Based on this, the following embodiments of this application provide a PH reporting method and apparatus. Impact of introduction of multi-beam transmission, a plurality of time-frequency resource configurations, or an uplink multi-waveform technology on a power headroom is considered, so that the power headroom is calculated and reported more accurately, to help a network side make a scheduling decision, thereby improving communication performance.

In the multi-beam transmission technology, the terminal may communicate with a plurality of RAN nodes through a plurality of beams on one carrier. The terminal may communicate with different RAN nodes through different beams. Alternatively, the terminal may communicate with one RAN node through a plurality of beams on one carrier, in other words, the terminal may communicate with a single RAN node through different beams.

Figure 2:
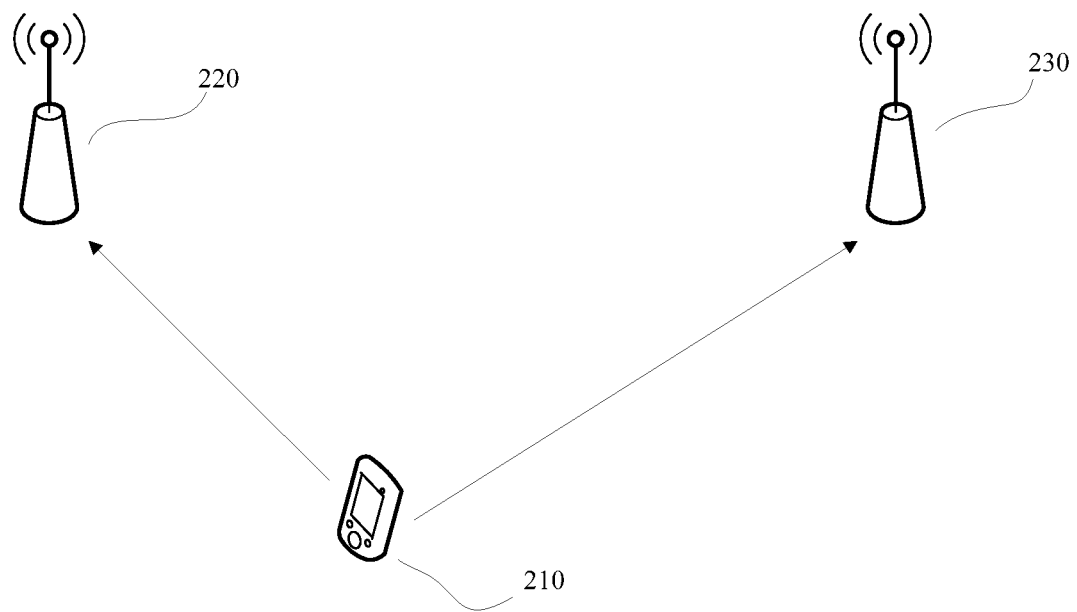
FIG. 2 is a schematic diagram of a multi-beam transmission scenario according to an embodiment of this application.
Figure 3:
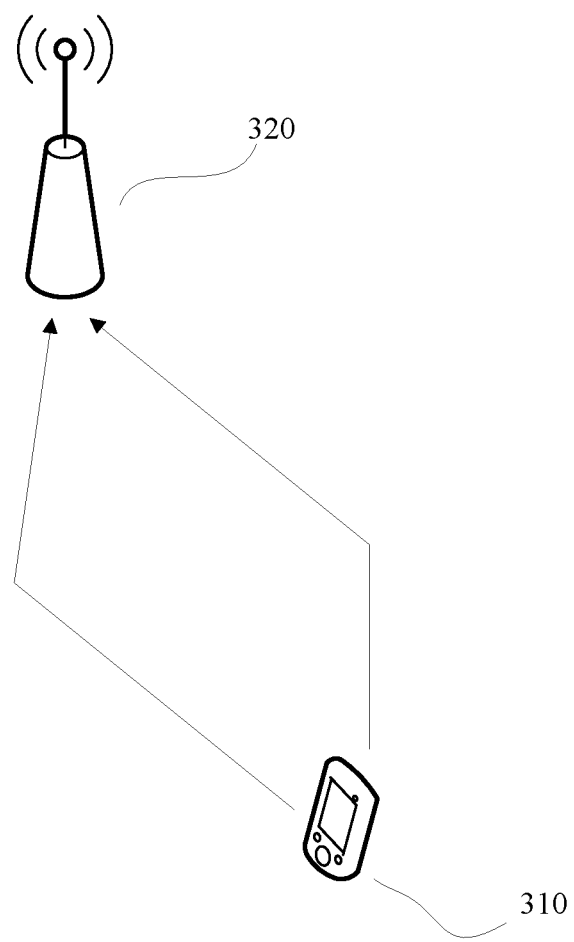
FIG. 3 is a schematic diagram of another multi-beam transmission scenario according to an embodiment of this application.

FIG. 2 is a schematic diagram of a multi-beam transmission scenario according to an embodiment of this application. In FIG. 2, a terminal communicates with different RAN nodes through different beams. FIG. 3 is a schematic diagram of another multi-beam transmission scenario according to an embodiment of this application. In FIG. 3, a terminal communicates with a single RAN node through different beams. For ease of understanding, an example herein in which the terminal communicates with the RAN node through two beams is used for description, but is not intended to limit this application. In addition, the terminal may use both the communication manners.

As shown in FIG. 2, a terminal 210 separately communicates with a RAN node 220 and a RAN node 230 on one carrier (or in a serving cell) through different beams. As shown in FIG. 3, a terminal 310 communicates with a RAN node 320 on one carrier through different beams. The beam may be understood as a space resource. Resource utilization can be improved through transmission on a plurality of beams. In addition, in the scenario shown in FIG. 3, impact of signal blockage can be reduced through transmission on the plurality of beams. For example, when transmission on one beam is blocked by an obstacle such as a vehicle or a person, communication may be maintained on another beam, so that current communication is not interrupted, thereby reducing the impact of the signal blockage. The beam is represented by an arrow in the figure, and may be understood as signal strength distribution. For example, a transmit beam may be understood as signal strength distribution formed in a spatial direction after a signal is transmitted outside through an antenna, and a receive beam may be understood as signal strength distribution that is formed in the spatial direction and is of a radio signal received from the antenna. The transmit beam may be the same as or may be different from the receive beam.

The antenna is weighted or the like when the signal is transmitted or received, so that energy of the signal is aggregated in a specific spatial direction. Signal energy aggregation in the direction may be understood as the beam. A beam resource has spatial directivity. After the signal is precoded, strength of the signal is centrally distributed in a specific spatial direction, and a relatively high receive power is achieved when the signal is received in the spatial direction. This feature may be referred to as spatial directivity (or energy transmission directivity).

The terminal may use different antenna ports to form different beams. For example, in the scenarios in FIG. 2 and FIG. 3, the terminal may use antenna ports, Ports D0 to D3, to form one beam direction, and use antenna ports, Ports D4 to D7, to form another beam direction. In the prior art, when reporting a PH, the terminal does not consider a plurality of beams, and calculates and reports a PH only for a single beam. Consequently, a basis for subsequently allocating a resource by the RAN node to the terminal is not accurate enough, thereby affecting communication performance.

Based on this, in an embodiment of this application, a beam status of the terminal in the subframe of the serving cell is considered in PH reporting, so that a reported PH more accurately reflects a power status in which a plurality of beams are used for transmission, to help the RAN node make a scheduling decision. When the terminal simultaneously uses the plurality of beams for transmission, the terminal may calculate a PH for each beam, and report information about a plurality of PHs to the RAN node when a trigger condition is met. In this case, the PH is specific to a single beam, and may be referred to as a beam-specific PH, in other words, the PH is separately calculated or reported for each beam. Alternatively, the terminal may calculate a PH with reference to a plurality of beams, and the terminal reports information about one PH when a trigger condition is met. The PH may be referred to as a joint PH, and the joint PH is obtained through calculation by considering a beam-specific parameter of the plurality of beams.

The beam-specific parameter is also referred to as a beam-level power control parameter, and the beam-level power control parameter is an independent parameter for a beam (or a beam group). For example, the terminal has uplink beams B1 to Bn, and there are respective parameters P1 to Pn for beams B1 to Bn. In other words, the parameter P1 is used for the beam B1, the parameter P2 is used for the beam B2, . . . , and the parameter Pn is used for the beam Bn. For another example, the terminal has beams B1 to Bn, the beams are divided into beam groups G1 to Gm, and there are respective parameters P1 to Pm for beam groups G1 to Gm. The parameter P1 is used for the beam group G1, and is applicable to all beams in the beam group G1; the parameter P2 is used for the beam group G2, and is applicable to all beams in the beam group G2; . . . ; and the parameter Pm is used for the beam group Gm, and is applicable to all beams in the beam group Gm, where both m and n are positive integers.

During multi-beam transmission, a power control parameter that may be affected includes:

Path loss $PL_c$ and path loss adjustment factor α: When the terminal communicates with a plurality of RAN nodes through a plurality of beams, the plurality of beams may pass through different propagation paths, and therefore may have different path losses. In addition, when the terminal communicates with one or more RAN nodes through the plurality of beams, because different beams have different beamforming weights and also have different beamforming gains, path losses may be different at a high frequency. If a same transmit power is used, a beam having a higher beamforming gain correspondingly has a higher receive power, and therefore has a smaller path loss.

Nominal (or reference) power $P_0$ (or $P_O$): Different path losses indicate different open-loop power control results. The RAN node may configure different values of $P_0$ for different beams. The terminal calculates a path loss of a reference beam without distinguishing between path losses of different beams. In this case, values of $P_0$ may be different but path losses are the same. Alternatively, when the terminal communicates with a plurality of RAN nodes through a plurality of beams, because interference levels of different cells are different, and different RAN nodes expect different receive powers, $P_0$ based on a beam (or a beam group) may be configured for the terminal.

Power offset value $\Delta_{TF,c}(i)$: When the terminal communicates with a plurality of RAN nodes through a plurality of beams, because data transmitted to different cells may have different formats, for example, two cells use different modulation and coding schemes (MCS), different values of $\Delta_{TF,c}(i)$ may be configured in this case.

Power adjustment value $f_c(i)$: When the terminal communicates with a plurality of RAN nodes through a plurality of beams, due to different interference levels in different cells, when an interference level in a cell changes, only a transmit power of a beam in a corresponding cell may need to be adjusted. Therefore, there are different dynamic adjustment values.

PUSCH transmission bandwidth $M_{PUSCH,c}(i)$: For flexible scheduling, a plurality of RAN nodes may independently schedule uplink resources, and allocate different bandwidth resources to the terminal for different beams. In the scenario in the type 3, the PUSCH transmission bandwidth $M_{PUSCH,c}(i)$ may be correspondingly an SRS transmission bandwidth $M_{SRS,c}$. The PUSCH transmission bandwidth $M_{PUSCH,c}(i)$ and the SRS transmission bandwidth $M_{SRS,c}$ are collectively referred to as a transmission bandwidth $M_c(i)$ below, in other words, $M_c(i)$ may include $M_{PUSCH,c}(i)$ or $M_{SRS,c}$.

It can be learned that for example, the beam-level power control parameter may include one or more of the following parameters: the nominal (or reference) power $P_0$ (or $P_O$), the path loss adjustment factor $\alpha$, the path loss $PL_c$, the power offset value $\Delta_{TF,c}(i)$, the power adjustment value $f_c(i)$, and the transmission bandwidth $M_c(i)$. In different scenarios, P separately corresponds to $P_{O\_PUSCH,c}(i)$, $P_{0\_PUCCH}$, and $P_{O\_SRS,c}(m)$ in the foregoing formulas. In different scenarios, $\alpha$ separately corresponds to $\alpha_c(j)$ and $\alpha_{SRC,c}$ in the foregoing formulas. In different scenarios, the transmission bandwidth $M_c(i)$ separately corresponds to $M_{PUSCH,c}(i)$ or $M_{SRS,c}$ in the foregoing formulas, and the like.

The information about the PH reported by the terminal may be the PH obtained through calculation, or may be indication information indicating the PH, for example, information about an index or information about an offset value. The information about the PH reported by the terminal is referred to as a PHR below.

Figure 4:
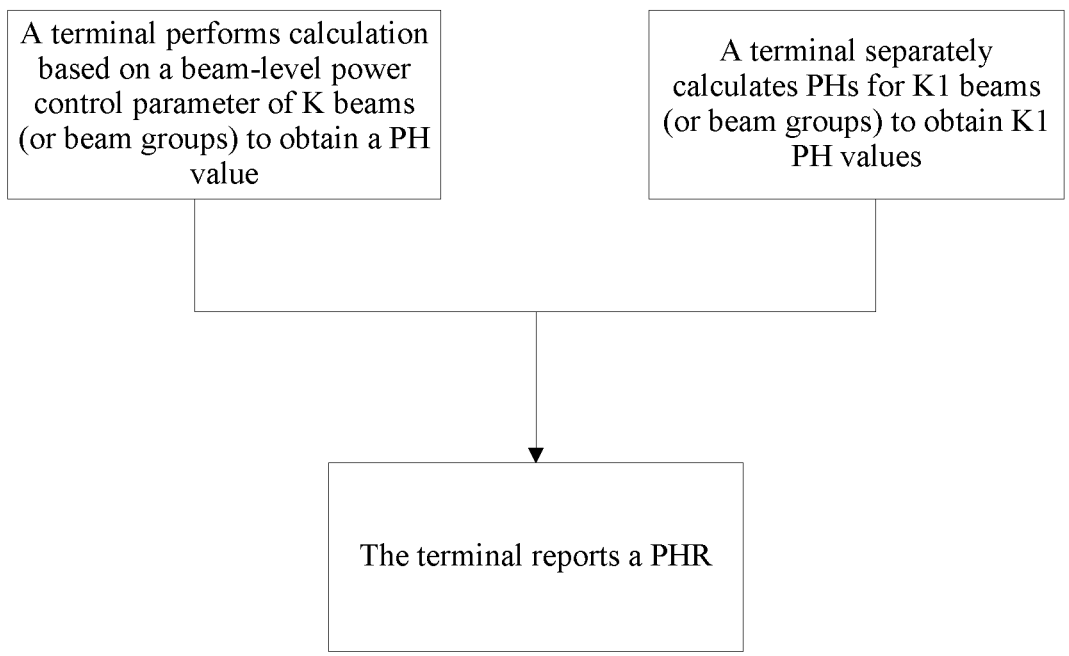
FIG. 4 is a schematic diagram of a PH reporting method according to an embodiment of this application.

FIG. 4 is a schematic diagram of a PH reporting method according to an embodiment of this application. The method is performed by a terminal, and the terminal performs transmission in a subframe i of a serving cell c through K beams (or beam groups), where K is a positive integer greater than or equal to 2. As shown in FIG. 4, the method includes the following steps.

S410. The terminal calculates a PH in a subframe of a serving cell. The terminal may perform calculation based on a beam-level power control parameter of K beams (or beam groups) to obtain a PH value; or the terminal may separately calculate PHs for K1 beams (or beam groups) to obtain K1 PH values, where K1 is less than or equal to K. In other words, the terminal may calculate PH values for all or some beams (or beam groups).

S420. The terminal reports a PHR. The PHR includes information about the PH value obtained through calculation based on the beam-level power control parameter of the K beams (or beam groups). Alternatively, the PHR includes information about the K1 PH values obtained through calculation. Alternatively, the PHR includes information about an average value of the K1 PH values. Alternatively, the PHR includes information about a reference PH value and information about an offset value. The reference PH value is one of the K1 PH values, and the offset value is an offset value of another PH value in the K1 PH values relative to the reference PH value. In this case, there are K1-1 offset values. Alternatively, the reference PH value is a baseline PH value, and the offset value is offset values of the K1 PH values relative to the baseline PH value. In this case, there are K1 offset values.

The information about the PH value may be the PH value, or may be information indicating the PH value, for example, an index. Similarly, the information about the offset value may be the offset value, or may be information indicating the offset value, for example, an index.

When K1 is equal to K, the terminal calculates PH values for all beams, and reports information about the PH values obtained through calculation, or reports information about an average value of all the PH values. The average value herein may be an average dB value or an average linear value, and is specifically described in detail in the following embodiments. When K1 is less than K, the K1 beams may be specified by a RAN node; or may be information about preset K1 maximum PH values, or information about preset K1 minimum PH values, or information about preset K1/2 maximum PH values and information about preset K1/2 minimum PH values, and are specifically described in detail in the following embodiments.

A case in which the terminal calculates the PH based on the beam-level power control parameter of the K beams (or beam groups) to obtain the PH value is applicable to a case in which a power is shared between antenna ports (or antenna port groups) on which a plurality of beams are formed, for example, a maximum transmit power is shared between the antenna ports (or antenna port groups). A case in which the terminal calculates a plurality of PH values is applicable to a case in which a power is not shared between antenna ports (or antenna port groups), or is applicable to a case in which a power is shared between antenna ports (or antenna port groups).

A case in which the terminal calculates the PH based on the beam-level power control parameter of the K beams (or beam groups) to obtain the PH value is first described.

For example, the beam-level power control parameter may include one or more of the following parameters: a nominal (or reference) power $P_0$ (or $P_O$), a path loss adjustment factor $\alpha$, a path loss $PL_c$, a power offset value $\Delta_{TF,c}(i)$, and a power adjustment value $f_c(i)$. The terminal may calculate the PH value only by using one or some of the parameters.

Case 1: For a case in which the terminal calculates the PH value only by using one beam-level power control parameter, the PH is calculated by using an average value of values of the parameter of a plurality of beams, such as an average decibel (dB) value or an average linear value. An example in which the parameter is a nominal power $P_0$ (or $P_O$) is used for description. A similar case is applied to another parameter. The nominal power $P_0$ (or $P_O$) used during PH calculation is an average value of the nominal powers $P_0$ (or $P_O$) of the plurality of beams, such as an average decibel (dB) value or an average linear value.

$P_{O\_PUSCH,c}(j)$ is used as an example. The average dB value may be expressed as $$P_{O\_PUSCH,c}(j) = \sum_{k=0}^{K-1} P_{O\_PUSCH,c,k}(j) \cdot \frac{N_k}{N},$$

and the average linear value may be expressed as $$P_{O\_PUSCH,c}(j) = 10\log_{10}\left(\sum_{k=0}^{K-1} 10^{(P_{O\_PUSCH,c,k}(j))/10} \cdot \frac{N_k}{N}\right).$$

Alternatively, impact of a quantity of antenna ports may not be considered, to reduce calculation complexity. In this case, the average dB value may be expressed as $$P_{O\_PUSCH,c}(j) = \frac{1}{K}\sum_{k=0}^{K-1} P_{O\_PUSCH,c,k}(j),$$

and the average linear value may be expressed as $$P_{O\_PUSCH,c}(j) = 10\log_{10}\left(\frac{1}{K}\sum_{k=0}^{K-1} 10^{(P_{O\_PUSCH,c,k}(j))/10}\right),$$

where N represents a quantity of antenna ports of the terminal in an uplink direction, in other words, the terminal has a total of N antenna ports in the uplink direction; k represents any beam (or beam group); $N_k$ represents a quantity of antenna ports on which the beam (or beam group) k is formed; and K represents a quantity of beams (or beam groups). The beam group refers to beams configured with a same beam-specific parameter or beams configured with a same power control parameter.

Alternatively, when the maximum transmit power represents a total power of a plurality of antennas, the average value may alternatively be replaced with a sum. The sum may be a sum of dB values or a sum of linear values. In this case, $P_{O\_PUSCH,c}(j)$ is expressed as follows:

the sum of the dB values may be expressed as $$P_{O\_PUSCH,c}(j) = \sum_{k=0}^{K-1} P_{O\_PUSCH,c,k}(j);$$

and
the sum of the linear values may be expressed as $$P_{O\_PUSCH,c}(j) = 10\log_{10}\left(\sum_{k=0}^{K-1} 10^{(P_{O\_PUSCH,c,k}(j))/10}\right).$$

Then, based on a scenario, the average dB value or the average linear value is substituted into one of the foregoing formulas (1) to (8) as $P_{O\_PUSCH,c}(j)$ to calculate the PH. In the foregoing calculation method, another parameter may be the same as that in the prior art except that $P_{O\_PUSCH,c}(j)$ changes in the formula. Details are not described herein again.

$P_{O\_PUCCH}$ and $P_{O\_SRS,c}(m)$ are calculated in a similar manner of calculating $P_{O\_PUSCH,c}(j)$, and $P_{O\_PUCCH}$ and $P_{O\_SRS,c}(m)$ obtained through calculation are substituted into the foregoing corresponding formula to obtain the PH through calculation. Details are not described herein again.

In addition, a manner of calculating the PH by using any one of the other beam-level power control parameters is similar to the foregoing manner of calculating the PH by using the nominal power $P_0$ (or $P_O$). For example, the other beam-level power control parameters are the path loss adjustment factor α, the path loss $PL_c$, the power offset value $\Delta_{TF,c}(i)$, and the power adjustment value $f_c(i)$. $PL_c$ is used as an example. An average dB value or an average linear value of path losses $PL_c$ of a plurality of beams is first obtained through calculation, and then based on a scenario, the average dB value or the average linear value is substituted into a formula that is for calculating the PH and that corresponds to the scenario. A formula for calculating the average dB value or the average linear value of the path losses $PL_c$ is similar to the formula for calculating the average dB value or the average linear value of the nominal powers $P_0$ (or $P_O$). A difference lies in that only $P_0$ (or $P_0$) is replaced with $PL_c$. Details are as follows:

$$PL_c = \sum_{k=0}^{K-1} PL_{c,k} \cdot \frac{N_k}{N}; \text{ or}$$

$$PL_c = 10\log_{10}\left(\sum_{k=0}^{K-1} 10^{(PL_{c,k})/10} \cdot \frac{N_k}{N}\right); \text{ or}$$

$$PL_c = \frac{1}{K}\sum_{k=0}^{K-1} PL_{c,k}; \text{ or}$$

$$PL_c = 10\log_{10}\left(\frac{1}{K}\sum_{k=0}^{K-1} 10^{(PL_{c,k})/10}\right).$$

Alternatively, when the maximum transmit power represents a total power of a plurality of antennas, the average value may alternatively be replaced with a sum. The sum may be a sum of dB values or a sum of linear values. In this case, $PL_c$ is expressed as follows:

$$PL_c = \sum_{k=0}^{K-1} PL_{c,k}; \text{ or}$$

$$PL_c = 10\log_{10}\left(\sum_{k=0}^{K-1} 10^{(PL_{c,k})/10}\right).$$

An average value calculation formula of another beam-level power control parameter is not listed herein, provided that $P_0$ or $PL_c$ in the foregoing formula for calculating the average value of the nominal powers $P_0$ or the path losses $PL_c$ is replaced with the another beam-level power control parameter.

Case 2: For a case in which the terminal calculates the PH value by using a plurality of beam-level power control parameters, the terminal may calculate the PH in a manner similar to that in the case 1. To be specific, average values of parameters are separately calculated, and then the PH is calculated by using the average values of these parameters.

For ease of understanding, two parameters are used as an example herein for description. A similar case is applied to more parameters. It is assumed that the two parameters are the nominal power $P_0$ (or $P_O$) and the path loss $PL_c$.

An average dB value or an average linear value of nominal powers $P_0$ (or $P_O$) of a plurality of beams, and an average dB value or an average linear value of path losses $PL_c$ of the plurality of beams are first obtained through calculation. Then, based on a scenario, the average dB value or the average linear value of the nominal powers $P_0$ (or $P_O$) and the average dB value or the average linear value of the path losses $PL_c$ are substituted into one of the foregoing formulas (1) to (8). A formula for calculating the average dB value or the average linear value of the nominal powers $P_0$ (or $P_O$) and a formula for calculating the average dB value or the average linear value of the path losses $PL_c$ of the plurality of beams are the same as the foregoing calculation formulas in the case 1. Details are not described herein again.

In the foregoing calculation manner, an average value is calculated for each beam-level power control parameter, and then is substituted into a corresponding formula for calculation based on a scenario. In another calculation manner, a comprehensive average value of these beam-specific parameters is calculated, and then the PH is calculated together with another parameter. In this case, a formula form changes.

For example, the beam-level power control parameter includes the nominal power $P_0$ (or $P_O$) and the path loss $PL_c$. The path loss adjustment factor $\alpha$ may be set to a beam-level power control parameter, or may not be set to a beam-level power control parameter, but because the path loss adjustment factor $\alpha$ is a coefficient of $PL_c$, the path loss adjustment factor $\alpha$ may be included in a separately calculated portion. In addition, the average value in this case also includes an average dB value and an average linear value. The scenario in the foregoing formula (1) is used as an example. In this case, the PH is calculated by using the following formula (11) or (12):

$$PH_{type1,c}(i) = P_{CMAX,c}(i) - \left\{ 10\log_{10}(M_{PUSCH,c}(i)) + \sum_{k=0}^{K-1}\left((P_{O\_PUSCH,c,k}(j) + \alpha_c(j) \cdot PL_{c,k}) \cdot \frac{N_k}{N}\right) + \Delta_{TF,c}(i) + f_c(i) \right\} \quad (11)$$

$$PH_{type1,c}(i) = P_{CMAX,c}(i) - \left\{ 10\log_{10}(M_{PUSCH,c}(i)) + 10\log_{10}\left(\sum_{k=0}^{K-1} 10^{(P_{O\_PUSCH,c,k}(j)+\alpha_c(j)\cdot PL_{c,k})/10} \cdot \frac{N_k}{N}\right) + \Delta_{TF,c}(i) + f_c(i) \right\} \quad (12)$$

Similarly, impact of a quantity of antenna ports may not be considered, to reduce calculation complexity. In this case, the PH is calculated by using the following formula (13) or (14):

$$PH_{type1,c}(i) = P_{CMAX,c}(i) - \left\{ 10\log_{10}(M_{PUSCH,c}(i)) + \frac{1}{K}\sum_{k=0}^{K-1}(P_{O\_PUSCH,c,k}(j) + \alpha_c(j)\cdot PL_{c,k}) + \Delta_{TF,c}(i) + f_c(i) \right\} \quad (13)$$

$$PH_{type1,c}(i) = P_{CMAX,c}(i) - \left\{ 10\log_{10}(M_{PUSCH,c}(i)) + 10\log_{10}\left(\frac{1}{K}\sum_{k=0}^{K-1} 10^{(P_{O\_PUSCH,c,k}(j)+\alpha_c(j)\cdot PL_{c,k})/10}\right) + \Delta_{TF,c}(i) + f_c(i) \right\} \quad (14)$$

Alternatively, when the maximum transmit power represents a total power of a plurality of antennas, power portions (referred to as beam-level power portions) of these beam-specific parameters are calculated, and then the beam-level power portions obtained through calculation are summed and the PH is calculated together with another parameter. For example, the beam-level power portion is open-loop power density. In this case, the PH is calculated by using the following formula (15) or (16):

$$PH_{type1,c}(i) = P_{CMAX,c}(i) - \left\{ 10\log_{10}(M_{PUSCH,c}(i)) + \sum_{k=0}^{K-1}(P_{O\_PUSCH,c,k}(j) + \alpha_c(j)\cdot PL_{c,k}) + \Delta_{TF,c}(i) + f_c(i) \right\} \quad (15)$$

$$PH_{type1,c}(i) = P_{CMAX,c}(i) - \left\{ 10\log_{10}(M_{PUSCH,c}(i)) + 10\log_{10}\left(\sum_{k=0}^{K-1} 10^{(P_{O\_PUSCH,c,k}(j)+\alpha_c(j)\cdot PL_{c,k})/10}\right) + \Delta_{TF,c}(i) + f_c(i) \right\} \quad (16)$$

Improvement to a formula in another scenario is similar to that to the foregoing formula. Details are not described herein again.

In still another calculation manner, power estimation values (namely, required transmit powers) corresponding to beams may be calculated, and then an average value of these power estimation values is obtained through calculation. The average value herein includes an average dB value or an average linear value. In this case, a formula form changes. The scenario in the foregoing formula (1) is used as an example. In this case, the PH is calculated by using the following formula (17) or (18):

$$PH_{type1,c}(i) = P_{CMAX,c}(i) - \left\{ \sum_{k=0}^{K-1} \left( 10\log_{10}(M_{PUSCH,c,k}(i)) + (P_{O\_PUSCH,c,k}(j) + \alpha_{c,k}(j) \cdot PL_{c,k} + \Delta_{TF,c,k}(i) + f_{c,k}(i)) \cdot \frac{N_k}{N} \right) \right\} \quad (17)$$

$$PH_{type1,c}(i) = P_{CMAX,c}(i) - \left\{ 10\log_{10} \left( \sum_{k=0}^{K-1} 10^{(10\log_{10}(M_{PUSCH,c,k}(i)) + P_{O\_PUSCH,c,k}(j) + \alpha_c(j) \cdot PL_{c,k} + \Delta_{TF,c,k}(i) + f_{c,k}(i))/10} \cdot \frac{N_k}{N} \right) \right\} \quad (18)$$

Similarly, impact of a quantity of antenna ports may not be considered, to reduce calculation complexity. In this case, the PH is calculated by using the following formula (19) or (20):

$$PH_{type1,c}(i) = P_{CMAX,c}(i) - \left\{ \frac{1}{K} \sum_{k=0}^{K-1} (10\log_{10}(M_{PUSCH,c,k}(i)) + P_{O\_PUSCH,c,k}(j) + \alpha_{c,k}(j) \cdot PL_{c,k} + \Delta_{TF,c,k}(i) + f_{c,k}(i)) \right\} \quad (19)$$

$$PH_{type1,c}(i) = P_{CMAX,c}(i) - \left\{ 10\log_{10} \left( \frac{1}{K} \sum_{k=0}^{K-1} 10^{(10\log_{10}(M_{PUSCH,c,k}(i)) + P_{O\_PUSCH,c,k}(j) + \alpha_{c,k}(j) \cdot PL_{c,k} + \Delta_{TF,c,k}(i) + f_{c,k}(i))/10} \right) \right\} \quad (20)$$

Regardless of whether the terminal calculates the PH by using some (including one) or all of the foregoing possible beam-level power control parameters, the terminal may calculate the PH by using one of the formulas (17) to (20). To be specific, power estimation values corresponding to beams are calculated, and then an average value of these power estimation values is obtained through calculation. Therefore, a manner of calculating the PH by using the average value is applicable to the case 1. A quantity of beam-level power control parameters used when the power estimation values of the beams are calculated is not limited, and one or more beam-level power control parameters may be used, namely, some or all of the foregoing possible beam-level power control parameters may be used, where using some of the foregoing possible beam-level power control parameters include a case of one beam-level power control parameter is used.

Alternatively, when the maximum transmit power represents a total power of a plurality of antennas, the PH is calculated by using the following formula (21) or (22):

foregoing possible beam-level power control parameters may be used, where some of the foregoing possible beam-level power control parameters include a case of one beam-level power control parameter is used.

Improvement to a formula in another scenario is similar to that to the foregoing formula. Details are not described herein again.

The following describes a case in which the terminal separately calculates PHs for K1 beams (or beam groups) to obtain K1 PH values, and reports information about the K1 PH values or information about an average value of the K1 PH values. The average value herein may be an average dB value or an average linear value. In addition, information about a reference PH value and information about an offset value may be reported to replace the reporting of the information about the K1 PH values.

Case 1: Based on a scenario, the terminal separately performs calculation for K beams (or beam groups) by using one of the foregoing formulas (1) to (10) to obtain corresponding PH values, where the PH values are denoted as $PH_1$ to $PH_K$, and the terminal reports information about $PH_1$ to $PH_K$, in other words, reports information about all PH values for beams (or beam groups) used for current transmission. In addition, the terminal may alternatively report $$PH_{type1,c}(i) = P_{CMAX,c}(i) - \left\{ \sum_{k=0}^{K-1} (10\log_{10}(M_{PUSCH,c,k}(i)) + P_{O\_PUSCH,c,k}(j) + \alpha_{c,k}(j) \cdot PL_{c,k}(j) + \Delta_{TF,c,k}(i) + f_{c,k}(i)) \right\} \quad (21)$$

$$PH_{type1,c}(i) = P_{CMAX,c}(i) - \left\{ 10\log_{10} \left( \sum_{k=0}^{K-1} 10^{(10\log_{10}(M_{PUSCH,c,k}(i)) + P_{O\_PUSCH,c,k}(j) + \alpha_{c,k}(j) \cdot PL_{c,k} + \Delta_{TF,c,k}(i) + f_{c,k}(i))/10} \right) \right\} \quad (22)$$

Regardless of whether the terminal calculates the PH by using some (including one) or all of the foregoing possible beam-level power control parameters, the terminal may calculate the PH by using the formula (21) or (22). To be specific, power estimation values corresponding to beams are calculated, and then a sum of these power estimation values is obtained through calculation. Therefore, a manner of calculating the PH by using the sum is applicable to the case 1. A quantity of beam-level power control parameters used when the power estimation values of the beams are calculated is not limited, and one or more beam-level power control parameters may be used, namely, some or all of the only information about one PH value, where the PH value is an average value of the K PH values, and the average value may be an average dB value or an average linear value.

Case 2: The terminal reports information about K1 PH values that is indicated by a RAN node, where K1 beams corresponding to the K1 PH values may be configured by the RAN node for the terminal. For example, the RAN node configures the K1 beams for the terminal by using higher layer information or physical layer signaling, where the higher layer signaling or the physical layer signaling includes indication information used to indicate the K1 beams. For example, the indication information is an index of a beam, a resource index of a channel state information-reference signal (CSI-RS), a resource index of a sounding reference signal (SRS), an antenna port index of an SRS, or the like. The K1 beams may be predefined, for example, beams 1 to 4. Alternatively, the K1 PH values may be PH values that meet a preset rule, for example, information about K1 maximum PH values, or information about K1 minimum PH values, or information about KT/2 maximum PH values and information about KT/2 minimum PH values.

Based on a scenario, the terminal separately performs calculation for the K beams (or beam groups) by using one of the foregoing formulas (1) to (10) to obtain the corresponding PH values, where the PH values are denoted as $PH_1$ to $PH_K$. Then, according to an instruction of the RAN node, the terminal may report information about the K1 PH values in the K PH values, or report information about PH values on the preset K1 beams, or report information about the K1 PH values that meet the preset rule.

In addition, the terminal may select a PH value to be reported, and notify the RAN node of a beam corresponding to information about the PH value reported by the terminal. For example, the terminal notifies the RAN node of the beam by using a bitmap. For example, when the RAN node instructs the terminal to report two PH values, to be specific, when K1=2, [0011] represents that PH values on the last two beams are selected for reporting.

In this case, the terminal may alternatively report only information about one PH value. The PH value is an average value of the K1 PH values, and the average value may be an average dB value or an average linear value.

Case 3: Based on a scenario, the terminal separately performs calculation for K beams (or beam groups) by using one of the foregoing formulas (1) to (10) to obtain corresponding PH values, where the PH values are denoted as $PH_1$ to $PH_K$. The terminal reports information about one of the PH values, calculates an offset value of another PH value relative to the PH value, and reports information about the offset value of the another PH value. In other words, the terminal reports $PH_k$ and a difference obtained by subtracting $PH_k$ from the another PH value, where k is selected according to a principle, and $PH_k$ is a reference PH value. The principle may be that k=1, or k represents a beam (or beam group) having a maximum PH value (a positive value is greater than a negative value).

For example, k=1. $PH_1$, $PH_2-PH_1$, . . . , and $PH_K-PH_1$ are reported.

In addition, the terminal may report the information about the K1 PH values in this manner of reporting an offset value, to be specific, report a PH value as a reference PH value, and report an offset value of another PH value relative to the reference PH value.

In addition, the reference PH value may not be a value in the K1 PH values, or may be a specified value or a PH value other than the K1 PH values in N PH values. In this case, the reference PH value is referred to as a baseline PH value.

When performs transmission through one beam in a subframe of a serving cell, the terminal calculates a PH value by using an existing way, and reports information about the PH value. Subsequently, the terminal may report the information about the K1 PH values based on an instruction of the RAN node or the terminal may select the K1 PH values and report the information about the K1 PH values. A reporting manner is the same as that in the foregoing embodiment. Details are not described herein again.

In the numerology technology, the terminal may support a plurality of time-frequency resource configurations. Based on this, in an embodiment of this application, a time-frequency resource configuration status of the terminal in the subframe i of the serving cell is considered in PH reporting, so that a reported PH more accurately reflects a power status on the plurality of time-frequency resource configurations, to help the RAN node make a scheduling decision.

When the terminal supports the plurality of time-frequency resource configurations, for different time-frequency resource configurations, a same parameter in parameters used during PH value calculation may have different values or configurations. A nominal power $P_0$ (or $P_O$) is used as an example. In a same transmission condition, different bit error rates can be achieved for the different time-frequency resource configurations (for example, subcarrier spacings). Therefore, the RAN node may expect different receive powers for the different time-frequency resource configurations, in other words, may configure different nominal powers $P_0$ for the terminal for the different time-frequency resource configurations. A PUSCH transmission bandwidth $M_{PUSCH,c}(i)$ is also used as an example. For the different time-frequency resource configurations, frequency division multiplexing may be performed in a single subframe of a serving cell, and different bandwidths are separately occupied. This scenario is applicable to a case in which a plurality of services coexist. In this case, the RAN node may separately allocate bandwidths for the plurality of time-frequency resource configurations. In addition, after a same frequency domain resource is allocated for the different time-frequency resource configurations, because sizes of frequency domain units (for example, sizes of subcarrier spacings) of the different time-frequency resource configurations are different, the same frequency domain resource occupies different actual bandwidths in frequency domain in the different time-frequency resource configurations. Therefore, PUSCH transmission bandwidths $M_{PUSCH,c}(i)$ may be different in the different time-frequency resource configurations. A similar case is applied to an SRS transmission bandwidth $M_{SRS,c}$. These parameters are referred to as time-frequency resource configuration-level power control parameters, or numerology power control parameters, or time-frequency resource configuration-specific parameters, or numerology-specific parameters below. To be specific, the time-frequency resource configuration-level power control parameter include one or both of the following parameters: a nominal power $P_0$ (or $P_O$) and a transmission bandwidth $M_c(i)$.

Case 1: When the terminal supports the plurality of time-frequency resource configurations, and currently performs transmission by using one time-frequency resource configuration, the terminal may calculate a PH value by using a parameter corresponding to the current time-frequency resource configuration, and report information about the PH value obtained through calculation. Alternatively, the terminal may configure a reference time-frequency resource configuration, convert, based on a currently used time-frequency resource configuration and the reference time-frequency resource configuration, a power control parameter affected by the time-frequency resource configuration, calculate a PH value by using the converted power control parameter, and report information about the PH value.

For example, the power control parameter is $M_{PUSCH,c}(i)$, and the time-frequency resource configuration is a subcarrier spacing. In this case, the PH value is calculated by using the following formula (23):

$$PH_{type1,c}(i) = \quad (23)$$

$$P_{CMAX,c}(i) - \left\{10\log_{10}\left(M_{PUSCH,c}(i) * \frac{SubSacing_{current}}{SubSacing_{reference}}\right) + \right.$$

$$\left. P_{O\_PUSCH,c}(j) + \alpha_c(j) \cdot PL_c + \Delta_{TF,c}(i) + f_c(i)\right\}$$

$SubSacing_{current}$ and $SubSacing_{reference}$ each are a current subcarrier spacing and a reference subcarrier spacing. The reference subcarrier spacing may be any subcarrier spacing selected from subcarrier spacing supported by the terminal, for example, 15 kHz.

Improvement to a formula in another scenario is similar to that to the foregoing formula. Details are not described herein again.

Figure 5:
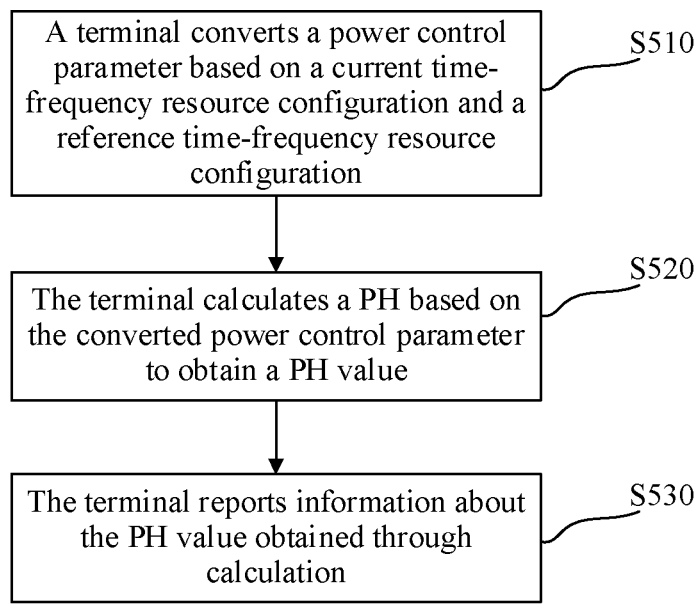
FIG. 5 is a schematic diagram of another PH reporting method according to an embodiment of this application.

FIG. 5 is a schematic diagram of another PH reporting method according to an embodiment of this application. The method is supported by a terminal. The terminal supports a plurality of time-frequency resource configurations, and the terminal performs transmission by using one time-frequency resource configuration in a subframe i of a serving cell c. The time-frequency resource configuration is referred to as a current time-frequency resource configuration. As shown in FIG. 5, the method includes the following steps:

S510. The terminal converts a power control parameter based on a current time-frequency resource configuration and a reference time-frequency resource configuration.

S520. The terminal calculates a PH based on the converted power control parameter to obtain a PH value.

S530. The terminal reports information about the PH value obtained through calculation.

For example, the power control parameter is a PUSCH transmission bandwidth $M_{PUSCH,c}(i)$. A similar case is applied to an SRS transmission bandwidth $M_{SRS,c}$.

Case 2: When supporting the plurality of time-frequency resource configurations, and currently performing transmission by using more than one time-frequency resource configuration, the terminal may use a PH reporting solution similar to that in the foregoing multi-beam transmission scenario. A difference lies in that the solution is different from the solution in which the average value is obtained, powers herein on different time-frequency resource configurations are in a summation relationship, but are not in an averaging relationship.

It is assumed that only one power control parameter is affected by the time-frequency resource configuration, in other words, the only one power control parameter varies with different time-frequency resource configurations. An example in which the power control parameter is a nominal power $P_0$ (or $P_O$) is used for description. A similar case is applied to another parameter. The nominal power $P_0$ (or $P_O$) used during PH calculation is a sum of nominal powers $P_0$ (or $P_O$) on the plurality of time-frequency resource configurations used by the terminal, for example, a sum of dB values or a sum of linear values, where the sum of the dB values is $$P_{O\_PUSCH,c}(j) = \sum_{nu=0}^{Nu-1} P_{O\_PUSCH,c,nu}(j),$$

and the sum of the linear values is $$P_{O\_PUSCH,c}(j) = 10\log_{10}\left(\sum_{nu=0}^{Nu-1} 10^{(P_{O\_PUSCH,c,nu}(j))/10}\right).$$

Then, based on a scenario, the sum of the dB values or the sum of the linear values is substituted into one of the foregoing formulas (1) to (8) as $P_{O\_PUSCH,c}(j)$ to calculate the PH. In the foregoing calculation method, another parameter may be the same as that in the prior art except that $P_{O\_PUSCH,c}(j)$ changes in the formula. Details are not described herein again.

It is assumed that more than one power control parameter is affected by the time-frequency resource configuration, in other words, more than one power control parameter varies with different time-frequency resource configurations.

The terminal may calculate the PH in a manner similar to that in which the only one power control parameter is affected by the time-frequency resource configuration. To be specific, a sum of dB values or a sum of linear values of each of the parameters is calculated, and then the PH is calculated by using sums of dB values or sums of linear values of these parameters.

In the foregoing calculation manner, a sum is separately calculated for each power control parameter, and then is substituted into a corresponding formula for calculation based on a scenario. In another calculation manner, a comprehensive sum of these parameters is calculated, where the sum is referred to as a sum of time-frequency resource configuration-level power portions, and then the PH is calculated by using the sum of the time-frequency resource configuration-level power portions together with other parameters. In this case, a formula form changes.

Power control parameters $P_{O\_PUSCH,c}(j)$ and $M_{PUSCH,c}(i)$ and the scenario in the formula (1) are used as an example. In this case, the PH is calculated by using the following formula (24) or (25):

$$PH_{type1,c}(i) = \quad (24)$$

$$P_{CMAX,c}(i) - \left\{\sum_{nu=0}^{Nu-1}(P_{O\_PUSCH,c,nu}(j) + 10\log_{10}(M_{PUSCH,c,nu}(i))) + \right.$$

$$\left. \alpha_c(j) \cdot PL_c + \Delta_{TF,c}(i) + f_c(i)\right\}$$

$$PH_{type1,c}(i) = P_{CMAX,c}(i) - \quad (25)$$

$$\left\{10\log_{10}\left(\sum_{nu=0}^{Nu-1} 10^{(P_{O\_PUSCH,c,nu}(j)+10\log_{10}(M_{PUSCH,c,nu}(i)))/10}\right) + \right.$$

$$\left. \alpha_c(j) \cdot PL_c + \Delta_{TF,c}(i) + f_c(i)\right\}$$

Herein, nu represents a quantity of time-frequency resource configurations, and represents a quantity of time-frequency resource configurations currently used by the terminal.

Improvement to a formula in another scenario is similar to that to the foregoing formula. Details are not described herein again.

In still another calculation manner, power estimation values (namely, required transmit powers) corresponding to time-frequency resource configurations may be calculated, and then a sum of these power estimation values is obtained through calculation. The sum herein includes a sum of dB values or a sum of linear values. In this case, a formula form changes. The scenario in the foregoing formula (1) is used as an example. In this case, the PH is calculated by using the following formula (26) or (27):

$$PH_{type1,c}(i) = P_{CMAX,c}(i) - \left\{ \sum_{nu=0}^{Nu-1} (10\log_{10}(M_{PUSCH,c,nu}(i)) + P_{O\_PUSCH,c,nu}(j) + \alpha_{c,nu}(j) \cdot PL_{c,nu} + \Delta_{TF,c,nu}(i) + f_{c,nu}(i)) \right\} \quad (26)$$

$$PH_{type1,c}(i) = P_{CMAX,c}(i) - \left\{ 10\log_{10}\left( \sum_{nu=0}^{Nu-1} 10^{(10\log_{10}(M_{PUSCH,c,nu}(i)) + P_{O\_PUSCH,c,nu}(j) + \alpha_{c,nu}(j) \cdot PL_{c,nu} + \Delta_{TF,c,nu}(i) + f_{c,nu}(i))/10} \right) \right\} \quad (27)$$

Regardless of whether the terminal calculates the PH by using some (including one) or all of the foregoing possible time-frequency resource configuration-level power control parameters, the terminal may calculate the PH by using the formula (26) or (27). A quantity of time-frequency resource configuration-level power control parameters used when the power estimation values of the time-frequency resource configurations are calculated is not limited, and one or more time-frequency resource configuration-level power control parameters may be used, namely, some or all of the foregoing possible time-frequency resource configuration-level power control parameters may be used, where using some of the foregoing possible time-frequency resource configuration-level power control parameters include a case of one time-frequency resource configuration-level power control parameter is used.

Improvement to a formula in another scenario is similar to that to the foregoing formula. Details are not described herein again.

In yet another calculation manner, the terminal may separately calculate PHs for the plurality of time-frequency resource configurations to obtain a plurality of PH values, and report information about the plurality of PH values.

For example, when the terminal currently performs transmission by using nu time-frequency resource configurations, the terminal may separately calculate PHs based on respective power control parameters of the nu time-frequency resource configurations to obtain nu PH values, where the PH values are denoted as $PH_1$ to $PH_{nu}$, and the terminal reports information about $PH_1$ to $PH_{nu}$. In addition, the terminal may use one of the PH values as a reference value, and report an offset value (or a difference) of another PH value relative to the reference value.

In addition, although the terminal currently performs transmission by using one time-frequency resource configuration, the terminal may also report information about a PH for another time-frequency resource configuration, so that the RAN node makes a scheduling decision. It may be pre-specified that information about a PH for a specific time-frequency resource configuration is reported, for example, information about PHs at subcarrier spacings of 15 k, 30 k, and 60 k is reported by default. Alternatively, information about a PH for a specific time-frequency resource configuration may be indicated by the RAN node. For example, the RAN node sends indication signaling to the terminal, where the indication signaling is used to indicate the time-frequency resource configuration of the information that is about the PH and that is reported by the terminal. The terminal receives the indication signaling, and reports the information about the PH for the time-frequency resource configuration indicated by the indication signaling. Alternatively, the terminal may select a time-frequency resource configuration of reported information about a PH.

Figure 6:
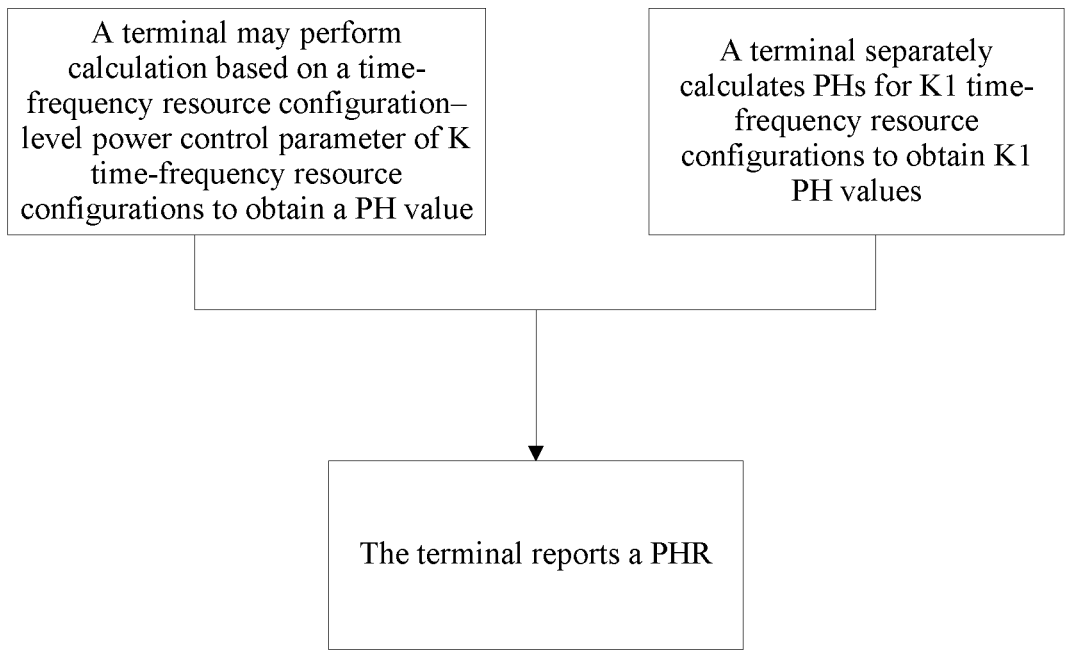
FIG. 6 is a schematic diagram of another PH reporting method according to an embodiment of this application.

FIG. 6 is a schematic diagram of a PH reporting method according to an embodiment of this application. The method is performed by a terminal, and the terminal uses nu time-frequency resource configurations, where nu is a positive integer greater than or equal to 2. As shown in FIG. 6, the method includes the following steps:

S610. The terminal calculates a PH in a subframe of a serving cell. The terminal may perform calculation based on a time-frequency resource configuration-level power control parameter of nu time-frequency resource configurations to obtain a PH value; or the terminal may separately calculate PHs for nu1 time-frequency resource configurations to obtain nu1 PH values, where nu1 is less than or equal to nu. In other words, the terminal may calculate PH values for all or some time-frequency resource configurations.

S620. The terminal reports a PHR. The PHR includes information about the PH value obtained through calculation based on the time-frequency resource configuration-level power control parameter of the nu time-frequency resource configurations. Alternatively, the PHR includes information about the nu1 PH values obtained through calculation. Alternatively, the PHR includes information about a reference PH value and information about an offset value. The reference PH value is one of the nu1 PH values, and the offset value is an offset value of another PH value in the nu1 PH values relative to the reference PH value. In this case, there are nu1-1 offset values. Alternatively, the reference PH value is a baseline PH value, and the offset value is offset values of the nu1 PH values relative to the baseline PH value. In this case, there are nu1 offset values.

When nu1 is equal to nu, the terminal calculates PH values for all time-frequency resource configurations, and reports information about the PH values obtained through calculation. When nu1 is less than nu, the nu1 time-frequency resource configurations may be specified by a RAN node, or may be preset.

When the terminal supports more than one waveform technology in an uplink direction, for example, supports an SC-OFDM technology and a DFT-S-OFDM technology, the terminal does not perform transmission by using both waveform technologies. Therefore, when calculating a PH corresponding to each waveform technology, the terminal may perform calculation by using an existing formula without adjusting the formula. For different waveform technologies, only a same parameter in parameters used during PH value calculation may have different values or configurations. A maximum transmit power $P_{CMAX,c}(i)$ or $\tilde{P}_{CMAX,c}(i)$ is used as an example. Because two waveforms correspond to different peak-to-average power ratios (PAPR), different power reductions may be used in different waveforms, and consequently different maximum transmit powers are configured for the terminal. A nominal power $P_O$ (or $P_O$) is also used as an example. Different waveforms have different received signal-to-noise ratios, and the RAN node may configure different values of $P_O$ for the different waveforms. Therefore, the terminal selects, based on a waveform technology used when the terminal performs transmission in the subframe of the serving cell, a parameter corresponding to the waveform technology to calculate a PH value, and reports information about the PH value obtained through calculation.

In an implementation, the terminal may calculate PH values of the two waveforms based on parameter configurations of the two waveforms. In a reporting process, in addition to reporting information about a PH of a current waveform, the terminal may report information about a PH of the other waveform, so that the RAN node makes a scheduling decision.

Whether the terminal reports the information about the PH of the other waveform may be determined in the following manner: In a first manner, the terminal reports information about PHs of the two waveforms by default or it is specified that the terminal reports information about PHs of the two waveforms. In a second manner, the RAN node instructs the terminal to report the information about the PH of the other waveform. For example, the RAN node sends indication signaling to the terminal, where the indication signaling is used to instruct the terminal to report the information about the PH of the other waveform. After receiving the indication signaling, the terminal reports the information about the PH of the other waveform according to the instruction of the RAN node. Alternatively, the indication signaling is used to indicate whether the terminal reports the information about the PHs of the two waveforms. When the terminal is instructed to report the information about the PHs of the two waveforms, the terminal reports the information about the PH of the other waveform according to the instruction of the RAN node.

The terminal may simultaneously report the information about the PHs of the two waveforms, or may report the information about the PH of the current waveform and then report the information about the PH of the other waveform. The terminal reports the information about the PH of the other waveform and the information about the PH of the current waveform in the following manners:

Manner 1: The terminal reports information about PH values of the two waveforms.

Manner 2: The terminal reports information about a PH value of the current waveform and an offset value (or a difference) of a PH value of the other waveform relative to the PH value of the current waveform.

Manner 3: The terminal reports a maximum transmit power $P_{CMAX,c}(i)$ or $\tilde{P}_{CMAX,c}(i)$ of the other waveform. A nominal power $P_0$ may be configured by the RAN node other than the maximum transmit power, and another parameter is not affected by a waveform. However, because the maximum transmit power is determined by the terminal and different waveforms may have different maximum transmit powers, the terminal may report only a maximum transmit power corresponding to the other waveform, and the RAN node may obtain scheduling capability requirements in different waveforms through conversion based on the PH value of the current waveform and the maximum transmit power of the other waveform.

Figure 7:
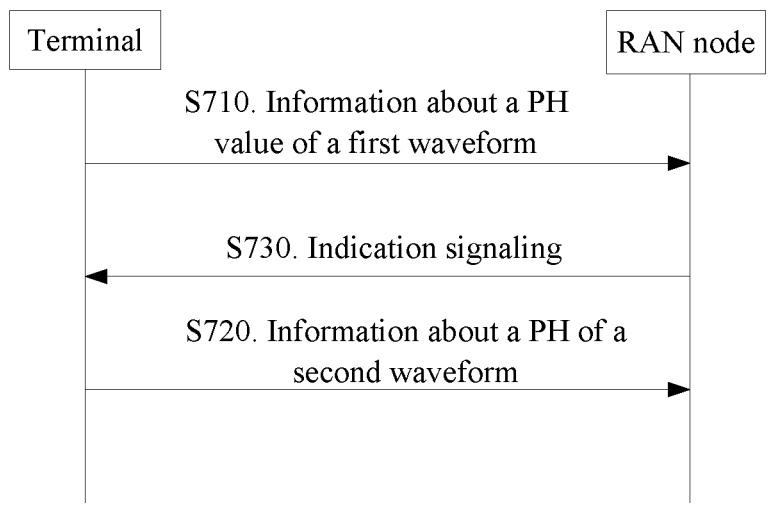
FIG. 7 is a schematic diagram of another PH reporting method according to an embodiment of this application.

Therefore, this embodiment of this application provides the PH reporting method. The method is applied to the terminal, and the terminal supports a first waveform and a second waveform in an uplink direction. Referring to FIG. 7, the method includes the following steps.

S710. The terminal reports, to a RAN node, information about a PH value of a current first waveform.

S720. The terminal reports, to the RAN node, information about a PH of a second waveform, where the information about the PH of the second waveform includes information about a PH value of the second waveform, or an offset value of the PH value of the second waveform relative to the PH value of the first waveform, or a maximum transmit power of the second waveform.

After receiving the information about the PH value of the first waveform, the RAN node determines the PH value of the first waveform to make a scheduling decision, to be specific, to determine whether to adjust a bandwidth resource allocated to the terminal.

Optionally, the terminal may report the information about the PH value of the first waveform and the information about the PH of the second waveform simultaneously.

Optionally, before the terminal reports, to the RAN node, the information about the PH of the second waveform, the method further includes the following step:

S730. The terminal receives indication signaling from the RAN node, where the indication signaling is used to instruct the terminal to report the information about the PH of the second waveform, and the terminal reports the information about the PH of the second waveform based on the indication signaling. Alternatively, the indication signaling is used to indicate whether the terminal can report information about PHs of the two waveforms. When the indication signaling indicates that the terminal can report the information about the PHs of the two waveforms, the terminal reports the information about the PH of the second waveform.

Figure 8:
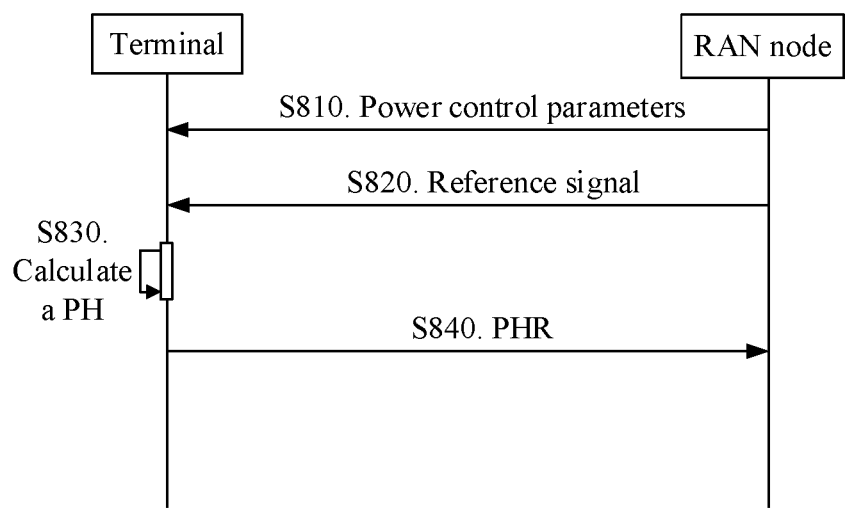
FIG. 8 is a schematic diagram of another PH reporting method according to an embodiment of this application.

FIG. 8 is a schematic diagram of a PH reporting method according to an embodiment of this application. As shown in FIG. 8, the method includes the following steps.

S810. A RAN node sends power control parameters to a terminal. These power control parameters are used by the terminal to perform uplink power control, and include parameters used by the terminal to calculate a PH. The scenario of Type 1 is used as an example. The power control parameters include a power control parameter $M_{PUSCH,c}(i)$, $P_{O\_NOMINAL\_PUSCH,c}(j)$ and $P_{O\_UE\_PUSCH,c}(j)$ that are used to determine $P_{O\_PUSCH,c}(j)$, $\alpha_c(j)$, $\Delta_{TF,c}(i)$, and $f_c(i)$.

There may be one or more RAN nodes herein. This is not limited herein.

In these power control parameters, a power control parameter has different configurations for different beams (or beam groups) is referred to as a beam-level power control parameter, a power control parameter has different configurations for different time-frequency resource configurations is referred to as a time-frequency resource configuration-level power control parameter, and a power control parameter has different configurations for different waveforms is referred to as a waveform-level power control parameter. The RAN node configures $P_{O\_NOMINAL\_PUSCH,c}(j)$ and $P_{O\_UE\_PUSCH,c}(j)$ that are used to obtain $P_{O\_PUSCH,c}(j)$. Therefore, $P_{O\_PUSCH,c}(j)$ in the power control parameters is used for description. A similar case is applied to another nominal power.

For example, the beam-level power control parameter may include one or more of the following parameters: a nominal (or reference) power $P_0$ (or $P_O$), a path loss adjustment factor $\alpha$, a path loss $PL_c$, a power offset value $\Delta_{TF,c}(i)$, a power adjustment value $f_c(i)$, and a transmission bandwidth $M_c(i)$. The time-frequency resource configuration-level power control parameter includes one or both of the following parameters: a nominal power $P_0$ (or $P_O$) and a transmission bandwidth $M_c(i)$. The waveform-level power control parameter includes one or both of the following parameters: a maximum transmit power $P_{CMAX,c}(i)$ or $\tilde{P}_{CMAX,c}(i)$ and a nominal power $P_0$ (or $P_O$).

S820. The RAN node sends a reference signal to the terminal. The reference signal may be used by the terminal to calculate a path loss. The path loss is also a power control parameter, and different beams may have different pass losses. Therefore, the path loss may be a beam-level power control parameter, so that the terminal can calculate the PH based on the path loss and the power control parameter configured by the RAN node.

For example, the reference signal may be a CSI-RS, a demodulation reference signal (DMRS), or the like. The RAN node may send different reference signals, and the different reference signals may be distinguished by using an antenna port number, a resource ID, a signal type of the reference signal, or a characteristic of the reference signal, where the characteristic of the reference signal includes a resource number (for example, a CSI-RS resource ID), an antenna port number, a time-frequency resource location (a pattern of the reference signal), or an initialization seed ID (such as $N_{ID}^{CSI}$ or $n_{ID}^{DMRS,i}$) generated based on a pilot sequence.

The terminal measures the reference signal to obtain the path loss, and the terminal may obtain the path loss through calculation based on a difference between a transmit power of the reference signal and a reference signal received power (RSRP) of the reference signal. The transmit power of the reference signal is configured by the RAN node for the terminal, and the RAN node may configure a reference signal power parameter for the terminal by using higher layer signaling such as radio resource control (RRC) signaling. After receiving the parameter, the terminal learns of the transmit power of the reference signal.

When the terminal communicates with the RAN node through a plurality of beams, the terminal may measure a plurality of path losses, in other words, separately calculate path losses on these beams. Therefore, the path loss $PL_c$ may be the beam-level power control parameter.

Optionally, a correspondence between a downlink resource used by the terminal to measure the path loss and an uplink transmitting resource used by the terminal may be set, so that a correspondence between the path loss measured by the terminal and an uplink beam can be learned. For example, the downlink resource herein refers to a CSI-RS resource ID, a CSI-RS antenna port, a DMRS antenna port, a codeword (CW) number, a downlink beam ID, a pilot ID used for beam management, or a mobile reference signal ID. The to-be-sent uplink resource herein may refer to an antenna port number, a resource number, a beam number, or the like of a PUSCH\PUCCH\PRACH\SRS or the like. The correspondence may be predefined, or may be indicated by the RAN node, for example, indicated by using downlink control information (DCI) or higher layer signaling.

For example, the RAN node sends a configuration parameter to the terminal. The configuration parameter indicates a correspondence between a downlink reference signal and an uplink transmitting resource, and the correspondence is shown in Table 1.

TABLE 1

| DL CSI-RS port | UL DMRS port |
| --- | --- |
| C0 | {D0 to D3} |
| C1 | {D4 to D7} |

After receiving the configuration parameter, the terminal may obtain such a correspondence. To be specific, a path loss obtained through calculation by using the downlink reference signal C0 corresponds to uplink resources on D0 to D3; and a path loss obtained through calculation by using the downlink reference signal C1 corresponds to uplink resources on D4 to D7. Because different antenna ports (or antenna port groups) correspond to different beams, the terminal can obtain path losses of the different beams.

S830. The terminal calculates the PH based on the power control parameters sent by the RAN node and the path loss obtained through measurement.

S840. The terminal reports a PHR.

A method for calculating the PH by the terminal and a manner of reporting the PHR by the terminal are the same as those in the descriptions in the foregoing embodiments. Details are not described herein again.

After receiving the PHR, the RAN node can make a scheduling decision based on the PHR, to be specific, determine whether to change a bandwidth resource allocated to the terminal.

An embodiment of this application further provides an apparatus for implementing the foregoing method, for example, provides an apparatus including units (or means) for implementing the steps performed by the terminal in any one of the foregoing implementation methods; for another example, further provides another apparatus including units (or means) for implementing the steps performed by the RAN node in any one of the foregoing implementation methods.

Figure 9:
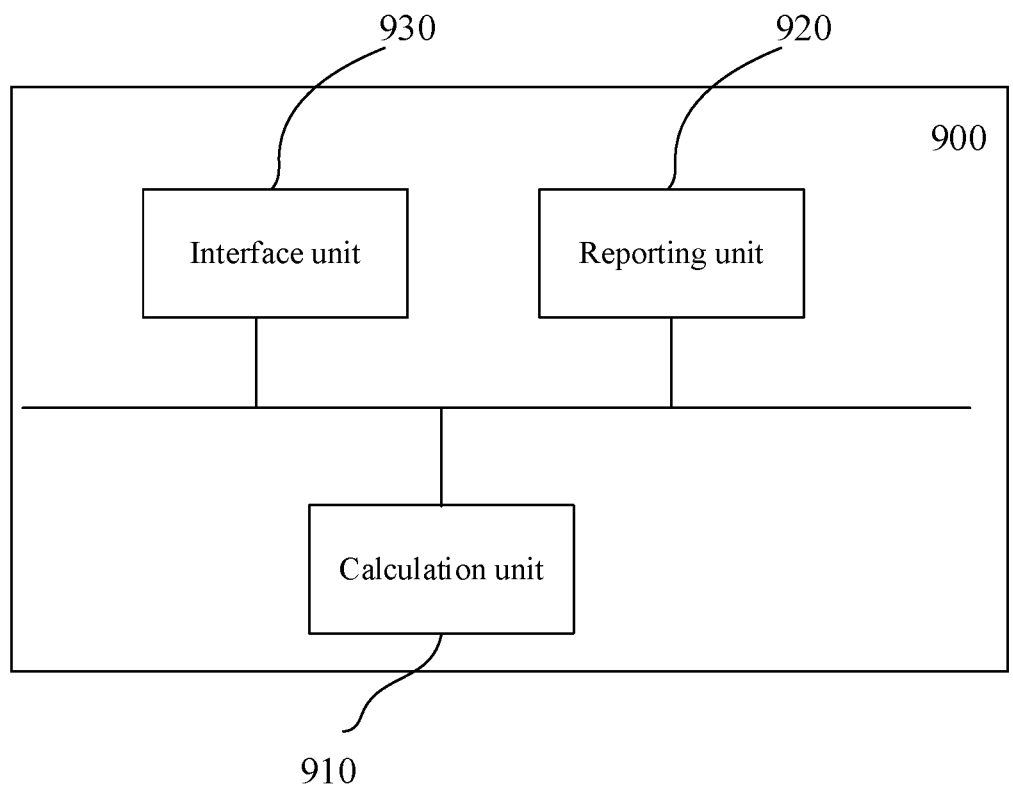
FIG. 9 is a schematic diagram of an apparatus according to an embodiment of this application.

FIG. 9 is a schematic diagram of an apparatus according to an embodiment of this application. The apparatus 900 is applied to a terminal. As shown in FIG. 9, the apparatus 900 includes units or means for performing the steps performed by the terminal in any method embodiment in the foregoing methods, and all detailed descriptions of these steps are applicable to the apparatus embodiment. The apparatus 900 includes a calculation unit 910 and a reporting unit 920. The calculation unit 910 is configured to calculate a PH value, and the reporting unit 920 is configured to report a PHR. The calculation unit 910 is configured to perform a calculation operation according to any one of FIG. 4 to FIG. 6. The reporting unit 920 may report information through an interface (for example, an air interface) between a RAN node and the terminal. The interface herein is a logical concept. In implementation, a corresponding logical unit needs to be disposed to meet a protocol requirement of a corresponding interface. The reporting unit 920 is a unit that controls reporting, and may report the information to the RAN node through a sending apparatus of the terminal such as an antenna and a radio frequency apparatus.

In addition, the apparatus 900 may further include an interface unit 930, configured to receive information sent by the RAN node. The terminal receives the information from the RAN node through a receiving apparatus. The interface unit 930 receives, from the receiving apparatus of the terminal, the information sent by the RAN node to the terminal, and performs interpretation and processing, for example, receives the power control parameter and the reference signal in FIG. 8.

It should be understood that division of the units of the foregoing apparatus is merely division of logical functions. During actual implementation, all or some of the units may be integrated into a physical entity, or may be physically separated. In addition, all the units may be implemented in a form of software invoked by a processing element, or may be implemented in a form of hardware; or some units may be implemented in a form of software invoked by a processing element, or some units are implemented in a form of hardware. For example, the calculation unit 910 may be a separately disposed processing element, or may be integrated into a chip of the terminal for implementation. In addition, the calculation unit 910 may alternatively be stored in a memory in a form of a program and invoked by a processing element of the terminal to perform a function of the unit. Implementation of another unit is similar to that of the calculation unit 910. In addition, all or some of the units may be integrated together or may be implemented separately. The processing element herein may be an integrated circuit having a signal processing capability. In an implementation process, the steps of the foregoing method or the foregoing units may be implemented by using an integrated logical circuit of hardware in the processor element, or by using an instruction in a form of software.

For example, the foregoing units may be configured as one or more integrated circuits for implementing the foregoing method, for example, one or more application-specific integrated circuits (ASIC), or one or more microprocessors (digital signal processor (DSP)), or one or more field programmable gate arrays (FPGA). For another example, when one of the foregoing units is implemented in a form of a processing element invoking a program, the processing element may be a general-purpose processor, for example, a central processing unit (CPU) or another processor that can invoke the program. For still another example, the units may be integrated together and implemented in a form of a system-on-a-chip (SOC).

Figure 10:
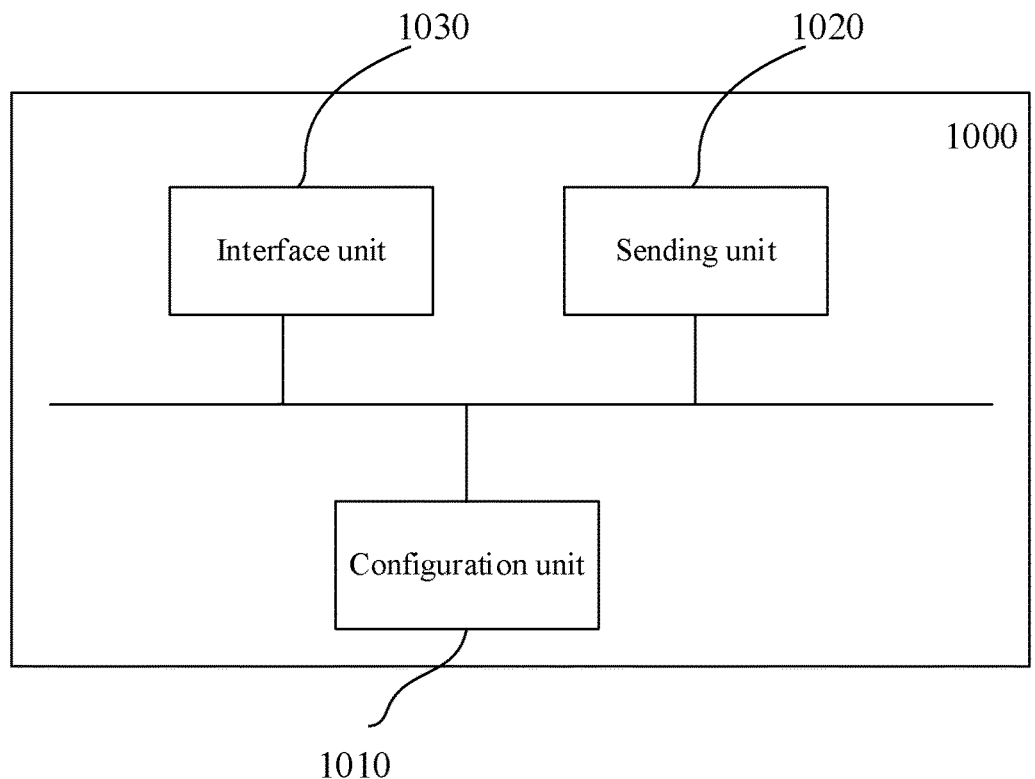
FIG. 10 is a schematic diagram of another apparatus according to an embodiment of this application.

FIG. 10 is a schematic diagram of an apparatus according to an embodiment of this application. The apparatus 1000 is applied to a RAN node. As shown in FIG. 10, the apparatus 1000 includes units or means for performing the steps performed by the RAN node in any method embodiment in the foregoing methods, and all detailed descriptions of these steps are applicable to the apparatus embodiment. The apparatus 1000 includes a configuration unit 1010, a sending unit 1020, and an interface unit 1030. The configuration unit 1010 is configured to configure a power control parameter, including a power control parameter used to calculate a PH. The sending unit 1020 is configured to send information to a terminal, for example, send a power control parameter and a reference signal. The interface unit 1030 is configured to receive the information sent by the terminal, for example, receive the PH. The sending unit 1020 may send the information to the terminal through an interface (for example, an air interface) between the RAN node and the terminal. The interface herein is a logical concept. In implementation, a corresponding logical unit needs to be disposed to meet a protocol requirement of a corresponding interface. The sending unit 1020 is a unit that controls sending, and may send the information to the terminal through a sending apparatus of the RAN node such as an antenna and a radio frequency apparatus. The RAN node receives the information from the terminal through a receiving apparatus. The interface unit 1030 receives, from the receiving apparatus of the RAN node, the information sent by the terminal, and performs interpretation and processing.

It should be understood that division of the units of the foregoing apparatus is merely division of logical functions. During actual implementation, all or some of the units may be integrated into a physical entity, or may be physically separated. In addition, all the units may be implemented in a form of software invoked by a processing element, or may be implemented in a form of hardware; or some units may be implemented in a form of software invoked by a processing element, or some units are implemented in a form of hardware. For example, the configuration unit 1010 may be a separately disposed processing element, or may be integrated into a chip of the RAN node for implementation. In addition, the configuration unit 1010 may alternatively be stored in a memory in a form of a program and invoked by a processing element of the RAN node to perform a function of the unit. Implementation of another unit is similar to that of the configuration unit 1010. In addition, all or some of the units may be integrated together or may be implemented separately. The processing element herein may be an integrated circuit having a signal processing capability. In an implementation process, the steps of the foregoing method or the foregoing units may be implemented by using an integrated logical circuit of hardware in the processor element, or by using an instruction in a form of software.

For example, the foregoing units may be configured as one or more integrated circuits for implementing the foregoing method, for example, one or more application-specific integrated circuits (ASIC), or one or more microprocessors (digital signal processor (DSP)), or one or more field programmable gate arrays (FPGA). For another example, when one of the foregoing units is implemented in a form of a processing element invoking a program, the processing element may be a general-purpose processor, for example, a central processing unit (CPU) or another processor that can invoke the program. For still another example, the units may be integrated together and implemented in a form of a system-on-a-chip (SOC).

Figure 11:
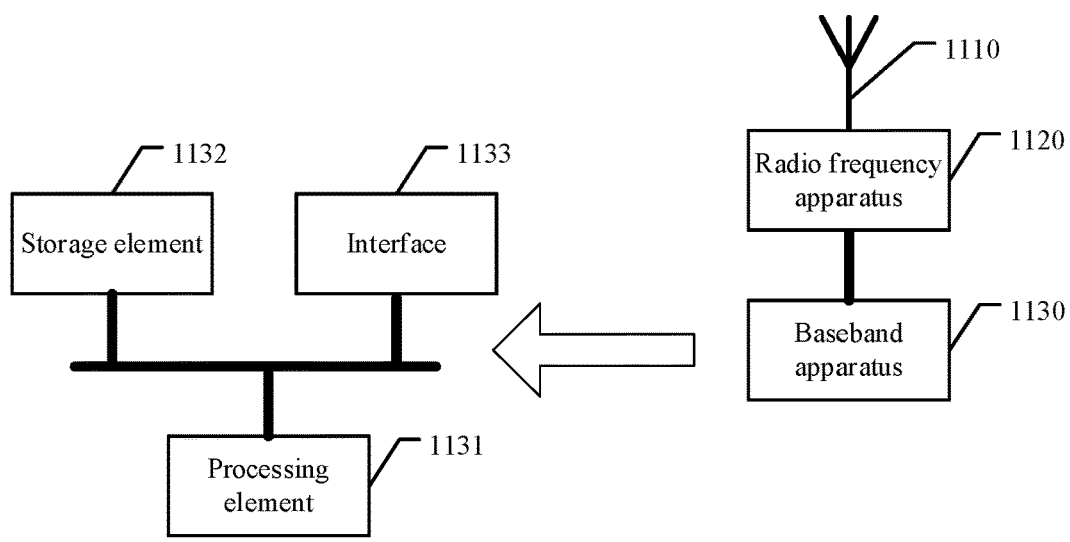
FIG. 11 is a schematic diagram of a RAN node according to an embodiment of this application.

FIG. 11 is a schematic structural diagram of a RAN node according to an embodiment of this application. The RAN node is configured to implement operations of the RAN node in the foregoing embodiment. As shown in FIG. 11, the RAN node includes an antenna 1110, a radio frequency apparatus 1120, and a baseband apparatus 1130. The antenna 1110 is connected to the radio frequency apparatus 1120. In an uplink direction, the radio frequency apparatus 1120 receives, through the antenna 1110, information sent by a terminal, and sends, to the baseband apparatus 1130, the information sent by the terminal for processing. In a downlink direction, the baseband apparatus 1130 processes information for the terminal, and sends the information for the terminal to the radio frequency apparatus 1120. The radio frequency apparatus 1120 processes the information for the terminal, and then sends the information for the terminal to the terminal through the antenna 1110.

The foregoing apparatus applied to the RAN node may be located in the baseband apparatus 1130. In an implementation, the units shown in FIG. 10 are implemented in a form of a processing element invoking a program. For example, the baseband apparatus 1130 includes a processing element 1131 and a storage element 1132. The processing element 1131 invokes a program stored in the storage element 1132, to perform the method performed by the RAN node in the foregoing method embodiment. In addition, the baseband apparatus 1130 may further include an interface 1133, configured to exchange information with the radio frequency apparatus 1120. For example, the interface is a common public radio interface (CPRI).

In another implementation, the units shown in FIG. 10 may be configured as one or more processing elements for implementing the method performed by the RAN node. These processing elements are disposed on the baseband apparatus 1130. The processing elements herein may be integrated circuits, for example, one or more ASICs, or one or more DSPs, or one or more FPGAs. These integrated circuits may be integrated together to form a chip.

For example, the units shown in FIG. 10 may be integrated together and implemented in a form of a system-on-a-chip (SOC). For example, the baseband apparatus 1130 includes an SOC chip configured to implement the foregoing method. The chip may be integrated with the processing element 1131 and the storage element 1132. The processing element 1131 invokes the program stored in the storage element 1132 to implement the foregoing method performed by the RAN node or functions of the units shown in FIG. 10. Alternatively, the chip may be integrated with at least one integrated circuit to implement the foregoing method performed by the RAN node or functions of the units shown in FIG. 10. Alternatively, the foregoing implementations may be combined, where functions of some units are implemented in a form of the processing element invoking the program, and functions of some units are implemented in a form of an integrated circuit.

In conclusion, regardless of the manners used, the foregoing apparatus applied to the RAN node includes at least one processing element and a storage element. The at least one processing element is configured to perform the method performed by the RAN node provided in the foregoing method embodiment. The processing element may perform, in a first manner, that is, in a manner of executing the program stored in the storage element, some or all steps performed by the RAN node in the foregoing method embodiment; or may perform, in a second manner, that is, in a manner of combining a hardware integrated logical circuit in the processor element with instructions, some or all steps performed by the RAN node in the foregoing method embodiment; and with reference to the first manner and the second manner, may certainly perform some or all steps performed by the RAN node in the foregoing method embodiment.

Similar to the foregoing description, the processing element herein may be a general-purpose processor such as a central processing unit (CPU), or may be configured as one or more integrated circuits for implementing the foregoing method, for example, one or more application-specific integrated circuits (ASIC), or one or more microprocessors (digital signal processor (DSP)), or one or more field programmable gate arrays (FPGA).

The storage element may be a memory, or may be a general term of a plurality of storage elements.

Figure 12:
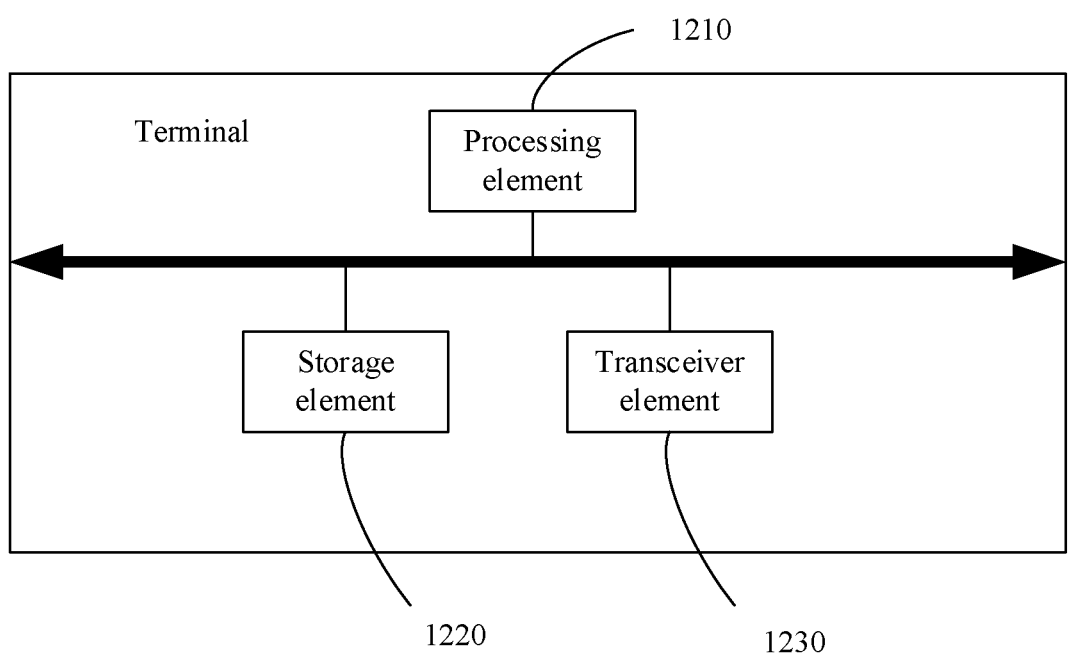
FIG. 12 is a schematic diagram of a terminal according to an embodiment of this application.

FIG. 12 is a schematic structural diagram of a terminal according to an embodiment of this application. The terminal may be the terminal in the foregoing embodiment, and is configured to implement operations of the terminal in the foregoing embodiment. As shown in FIG. 12, the terminal includes a processing element 1210, a storage element 1220, and a transceiver element 1230. The transceiver element 1230 may be connected to an antenna. In a downlink direction, the transceiver element 1230 receives, through the antenna, information sent by a RAN node, and sends the information to the processing element 1210 for processing. In an uplink direction, the processing element 1210 processes data of the terminal, and sends the data of the terminal to the RAN node through the transceiver element 1230.

The storage element 1220 is configured to store a program for implementing the foregoing method embodiment. The processing element 1210 invokes the program, to perform operations in the foregoing method embodiment.

In another implementation, the foregoing units in FIG. 9 may be configured as one or more processing elements for implementing the foregoing method performed by the terminal. These processing elements are disposed on a circuit board of the terminal. The processing elements herein may be integrated circuits, for example, one or more ASICs, or one or more DSPs, or one or more FPGAs. These integrated circuits may be integrated together to form a chip.

For example, the foregoing units in FIG. 9 may be integrated together and implemented in a form of a system-on-a-chip (SOC). For example, the terminal includes the SOC chip configured to implement the foregoing method. The chip may be integrated with the processing element 1210 and the storage element 1220. The processing element 1210 invokes the program stored in the storage element 1220 to implement the foregoing method or functions of the foregoing units in FIG. 9. Alternatively, the chip may be integrated with at least one integrated circuit to implement the foregoing method or functions of the foregoing units in FIG. 9. Alternatively, the foregoing implementations may be combined, where functions of some units are implemented in a form of the processing element invoking the program, and functions of some units are implemented in a form of an integrated circuit.

In conclusion, regardless of the manners used, the foregoing apparatus includes at least one processing element and a storage element. The at least one processing element is configured to perform the method provided in the foregoing method embodiment. The processing element may perform, in a first manner, that is, in a manner of executing the program stored in the storage element, some or all steps performed by the terminal in the foregoing method embodiment; or may perform, in a second manner, that is, in a manner of combining a hardware integrated logical circuit in the processing element with instructions, some or all steps performed by the terminal in the foregoing method embodiment; and with reference to the first manner and the second manner, may certainly perform some or all steps performed by the terminal in the foregoing method embodiment.

Similar to the foregoing description, the processing element herein may be a general-purpose processor such as a central processing unit (CPU), or may be configured as one or more integrated circuits for implementing the foregoing method, for example, one or more application-specific integrated circuits (ASIC), or one or more microprocessing elements (digital signal processor (DSP)), or one or more field programmable gate arrays (FPGA).

The storage element may be a memory, or may be a general term of a plurality of storage elements.

A person of ordinary skill in the art may understand that all or some of the steps in the method embodiments may be implemented by a program instructing relevant hardware. The program may be stored in a computer readable storage medium. When the program runs, the steps in the method embodiments are performed. The foregoing storage medium includes any medium that can store program code, such as a ROM, a RAM, a magnetic disk, or an optical disc.

What is claimed is:

1. A power headroom reporting method, comprising:
   determining, by a terminal, a power headroom (PH) in a subframe of a serving cell, wherein the terminal performs transmission in the subframe of the serving cell through K beams or beam groups, and K is a positive integer greater than or equal to 2, wherein the determining the PH further comprises: determining the PH based on a beam-level power control parameter of the K beams or beam groups to obtain one PH value; or separately determining PHs for K1 beams or beam groups to obtain K1 PH values, wherein K1 is a positive integer less than or equal to K; and
   reporting, by the terminal, a power headroom report (PHR), wherein the PHR comprises one of the following (a)-(d):
   (a) information about the determined PH value based on the beam-level power control parameter of the K beams or beam groups;
   (b) information about the K1 PH values;

(c) information about a reference PH value and information about an offset value, wherein the reference PH value is one of the K1 PH values, and the offset value is an offset value of another PH value in the K1 PH values relative to the reference PH value; or the reference PH value is a baseline PH value, and the offset value is offset values of the K1 PH values relative to the baseline PH value;

(d) information about an average value of the K1 PH values.

2. The method according to claim 1, wherein the beam-level power control parameter comprises one or more of the following parameters:

a nominal power, a path loss adjustment factor, a path loss, a power offset value, a power adjustment value, and a transmission bandwidth.

3. The method according to claim 2, wherein the determining, by the terminal, the PH based on the beam-level power control parameter of the K beams or beam groups comprises:

determining, by the terminal, the PH based on a first parameter of the K beams or beam groups, wherein the first parameter is one of the nominal power, the path loss adjustment factor, the path loss, the power offset value, the power adjustment value, and the transmission bandwidth.

4. The method according to claim 3, wherein the determining, by the terminal, the PH based on the first parameter of the K beams or beam groups comprises:

determining an average value of values of the first parameter of the K beams or beam groups, wherein the average value comprises an average decibel (dB) value or an average linear value; and determining, in accordance with the determining the average value, the PH based on the average value.

5. The method according to claim 3, wherein the determining, by the terminal, the PH based on the first parameter of the K beams or beam groups comprises:

determining a sum of values of the first parameter of the K beams or beam groups, wherein the sum comprises a sum of decibel (dB) values or a sum of linear values; and determining, in accordance with the determining the sum of values, the PH based on the sum of values.

6. The method according to claim 2, wherein the determining, by the terminal, the PH based on the beam-level power control parameter of the K beams or beam groups comprises:

determining, by the terminal, the PH based on a plurality of parameters of the K beams or beam groups, wherein the plurality of parameters are some or all of the nominal power, the path loss adjustment factor, the path loss, the power offset value, the power adjustment value, and the transmission bandwidth.

7. The method according to claim 6, wherein the determining, by the terminal, the PH based on the plurality of parameters of the K beams or beam groups comprises one of the following (a)-(f):

(a) determining an average value of each of the plurality of parameters of the K beams or beam groups, wherein the average value comprises an average decibel (dB) value or an average linear value; and determining, in accordance with the determining the average value, the PH based on a plurality of average values;

(b) determining a sum of each of the plurality of parameters of the K beams or beam groups, wherein the sum comprises a sum of dB values or a sum of linear values; and determining, in accordance with the determining the sum, the PH based on a plurality of determined sums;

(c) determining a comprehensive average value of the plurality of parameters, wherein the comprehensive average value comprises an average dB value or an average linear value; and determining, in accordance with the determining the comprehensive average value, the PH based on the comprehensive average value;

(d) determining a sum of beam-level power portions of the plurality of parameters, wherein the sum comprises a sum of dB values or a sum of linear values; and determining, in accordance with the determining the sum of the beam-level power portions, the PH based on the sum of the beam-level power portions;

(e) separately determining power estimation values of the K beams or beam groups; determining an average value of the K power estimation values, wherein the average value comprises an average dB value or an average linear value; and determining the PH based on the average value of the K power estimation values; and (f) separately determining power estimation values of the K beams or beam groups; determining a sum of the K power estimation values, wherein the sum comprises a sum of dB values or a sum of linear values; and determining the PH based on the sum of the K power estimation values.

8. An apparatus, comprising at least one processor and a memory coupled to the at least one processor and having processor-executable instructions stored thereon, which when executed, cause the at least one processor being to:

determine a power headroom (PH) in a subframe of a serving cell, wherein transmission is performed in the subframe of the serving cell through K beams or beam groups, and K is a positive integer greater than or equal to 2; wherein the determining the PH further comprises: determining the PH based on a beam-level power control parameter of the K beams or beam groups to obtain one PH value; or separately determining PHs for K1 beams or beam groups to obtain K1 PH values, wherein K1 is a positive integer less than or equal to K; and report a power headroom report (PHR), wherein the PHR comprises one of the following (a)-(d):

(a) information about the determined PH value based on the beam-level power control parameter of the K beams or beam groups;

(b) information about the K1 PH values;

(c) information about a reference PH value and information about an offset value, wherein the reference PH value is one of the K1 PH values, and the offset value is an offset value of another PH value in the K1 PH values relative to the reference PH value; or the reference PH value is a baseline PH value, and the offset value is offset values of the K1 PH values relative to the baseline PH value;

(d) information about an average value of the K1 PH values.

9. The apparatus according to claim 8, wherein the beam-level power control parameter comprises one or more of the following parameters:

a nominal power, a path loss adjustment factor, a path loss, a power offset value, a power adjustment value, and a transmission bandwidth.

10. The apparatus according to claim 9, wherein the at least one processor is further configured to:

determine the PH based on a first parameter of the K beams or beam groups, wherein the first parameter is one of the nominal power, the path loss adjustment factor, the path loss, the power offset value, the power adjustment value, and the transmission bandwidth.

11. The apparatus according to claim 10, wherein the at least one processor is further configured to:
determine an average value of values of the first parameter of the K beams or beam groups, wherein the average value comprises an average decibel (dB) value or an average linear value; and
determine, in accordance with the determining the average value, the PH based on the average value.

12. The apparatus according to claim 10, wherein the at least one processor is further configured to:
determine, a sum of values of the first parameter of the K beams or beam groups, wherein the sum comprises a sum of decibel (dB) values or a sum of linear values; and
determine, in accordance with the determining the sum of values, the PH based on the sum.

13. The apparatus according to claim 9, wherein the at least one processor is further configured to:
determine the PH based on a plurality of parameters of the K beams or beam groups, wherein the plurality of parameters are some or all of the nominal power, the path loss adjustment factor, the path loss, the power offset value, the power adjustment value, and the transmission bandwidth.

14. The apparatus according to claim 13, wherein the at least one processor is further configured to:
determine an average value of each of the plurality of parameters of the K beams or beam groups, wherein the average value comprises an average decibel (dB) value or an average linear value; and
determine, in accordance with the determining the average value, the PH based on a plurality of average values.

15. The apparatus according to claim 13, wherein the at least one processor is further configured to:
determine a sum of each of the plurality of parameters of the K beams or beam groups, wherein the sum comprises a sum of decibel (dB) values or a sum of linear values; and
determine, in accordance with the determining the sum, the PH based on a plurality of determined sums.

16. The apparatus according to claim 13, wherein the at least one processor is further configured to:
determine a comprehensive average value of the plurality of parameters, wherein the comprehensive average value comprises an average decibel (dB) value or an average linear value; and
determine, in accordance with the determining the comprehensive average value, the PH based on the comprehensive average value obtained through calculation.

17. The apparatus according to claim 13, wherein the at least one processor is further configured to:
determine a sum of beam-level power portions of the plurality of parameters, wherein the sum comprises a sum of decibel (dB) values or a sum of linear values; and
determining, in accordance with the determining the sum of the beam-level power portions, the PH based on the sum of the beam-level power portions.

18. The apparatus according to claim 13, wherein the at least one processor is further configured to:
separately determine power estimation values of the K beams or beam groups; and determine an average value of the K power estimation values, wherein the average value comprises an average decibel (dB) value or an average linear value; and
determine the PH based on the average value of the K power estimation values.

19. The apparatus according to claim 13, wherein the at least one processor is further configured to:
separately determine power estimation values of the K beams or beam groups; and determine a sum of the K power estimation values, wherein the sum comprises a sum of dB values or a sum of linear values; and
determine the PH based on the sum of the K power estimation values.

20. A non-transitory computer-readable storage medium, comprising a program, which when being executed by a processor, cause the processor to perform the following
determining a power headroom (PH) in a subframe of a serving cell, wherein transmission is performed in the subframe of the serving cell through K beams or beam groups, and K is a positive integer greater than or equal to 2, wherein the determining the PH further comprises:
determining the PH based on a beam-level power control parameter of the K beams or beam groups to obtain one PH value; or separately calculating PHs for K1 beams or beam groups to obtain K1 PH values, wherein K1 is a positive integer less than or equal to K; and
reporting a power headroom report (PHR), wherein the PHR comprises one of the following (a)-(d):
(a) information about the determined PH value based on the beam-level power control parameter of the K beams or beam groups;
(b) information about the K1 PH values;
(c) information about a reference PH value and information about an offset value, wherein the reference PH value is one of the K1 PH values, and the offset value is an offset value of another PH value in the K1 PH values relative to the reference PH value; or the reference PH value is a baseline PH value, and the offset value is offset values of the K1 PH values relative to the baseline PH value; and
(d) information about an average value of the K1 PH values.

* * * * *

UNITED STATES PATENT AND TRADEMARK OFFICE
CERTIFICATE OF CORRECTION

PATENT NO. : 10,856,274 B2
APPLICATION NO. : 16/673509
DATED : December 1, 2020
INVENTOR(S) : Ji et al.

Page 1 of 1

It is certified that error appears in the above-identified patent and that said Letters Patent is hereby corrected as shown below:

In the Claims

Claim 8: Column 36, Line 32: "when executed, cause the at least one processor being to:" should read -- when executed, cause the at least one processor to: --.

Claim 19: Column 38, Line 23: "sum of dB values or a sum of linear values; and" should read -- sum of decibel dB values or a sum of linear values; and --.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*